US012488749B2

(12) United States Patent
Fan et al.

(10) Patent No.: US 12,488,749 B2
(45) Date of Patent: Dec. 2, 2025

(54) DISPLAY SUBSTRATE AND DISPLAY APPARATUS

(71) Applicants: Yunnan Invensight Optoelectronics Technology Co., Ltd., Yunnan (CN); BOE TECHNOLOGY GROUP CO., LTD., Beijing (CN)

(72) Inventors: Longfei Fan, Beijing (CN); Yaoxi Ma, Beijing (CN); Dachao Li, Beijing (CN); Shanghong Jiang, Beijing (CN); Pengcheng Lu, Beijing (CN); Shengji Yang, Beijing (CN); Xiaochuan Chen, Beijing (CN)

(73) Assignees: Yunnan Invensight Optoelectronics Technology Co., Ltd., Yunnan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/558,265

(22) PCT Filed: Dec. 19, 2022

(86) PCT No.: PCT/CN2022/140139
§ 371 (c)(1),
(2) Date: Oct. 31, 2023

(87) PCT Pub. No.: WO2024/130510
PCT Pub. Date: Jun. 27, 2024

(65) Prior Publication Data
US 2025/0087152 A1 Mar. 13, 2025

(51) Int. Cl.
*G09G 3/3233* (2016.01)

(52) U.S. Cl.
CPC ... *G09G 3/3233* (2013.01); *G09G 2300/0426* (2013.01); *G09G 2300/0465* (2013.01);
(Continued)

(58) Field of Classification Search
CPC ......... G09G 3/3233; G09G 2300/0426; G09G 2300/0465; G09G 2300/0852; G09G 2310/061
See application file for complete search history.

(56) References Cited

U.S. PATENT DOCUMENTS 9,786,227 B2 * 10/2017 Kim ..................... G09G 3/3266
10,013,917 B2 * 7/2018 Kim ..................... G09G 3/3258
(Continued)

FOREIGN PATENT DOCUMENTS

CN 102610660 A 7/2012
CN 104715723 A 6/2015
(Continued)

OTHER PUBLICATIONS

Dictionary.com, “adjacent,” in Dictionary.com Unabridged. Source location: Random House, Inc. http://dictionary.reference.com/browse/adjacent, Nov. 18, 2011, p. 1.*
(Continued)

*Primary Examiner* — Jeff Piziali
(74) *Attorney, Agent, or Firm* — Dority & Manning, P.A.

(57) ABSTRACT

A display substrate includes an array substrate including pixels and pixel driving circuits. A pixel driving circuit includes a driving sub-circuit and a storage sub-circuit. The storage sub-circuit includes: a first capacitor coupled to a first node and a second node, and a second capacitor coupled to the second node and a first voltage signal terminal. The driving sub-circuit is configured to generate a driving current under control of the storage sub-circuit and transmit the driving current to a light-emitting device. In a direction perpendicular to the array layer, the first plate, the second plate, the third plate and the fourth plate have an overlapping region therebetween.

17 Claims, 17 Drawing Sheets

(52) U.S. Cl.
CPC ............... *G09G 2300/0852* (2013.01); *G09G 2310/061* (2013.01)

(56) References Cited

U.S. PATENT DOCUMENTS

| | | | | |
|---|---|---|---|---|
| 10,170,054 | B2 * | 1/2019 | Park | G09G 3/3275 |
| 10,210,813 | B2 * | 2/2019 | Kimura | G09G 3/3291 |
| 10,783,830 | B1 * | 9/2020 | Lu | G09G 3/3258 |
| 10,832,618 | B2 * | 11/2020 | Gao | G09G 3/3283 |
| 11,024,698 | B2 * | 6/2021 | Tamura | G09G 3/20 |
| 11,367,381 | B2 * | 6/2022 | Cho | G09G 3/30 |
| 11,393,430 | B2 * | 7/2022 | Nagasaki | G09G 3/32 |
| 11,430,389 | B2 * | 8/2022 | Fujii | H10D 86/441 |
| 11,620,942 | B2 * | 4/2023 | Yang | G09G 3/3233 345/212 |
| 11,651,733 | B1 * | 5/2023 | Sun | G09G 3/3233 345/212 |
| 11,749,202 | B2 * | 9/2023 | Yang | G11C 19/28 345/204 |
| 11,823,643 | B2 * | 11/2023 | Tsuboi | G09G 5/10 |
| 11,887,521 | B2 * | 1/2024 | Yang | G09G 3/20 |
| 11,915,651 | B2 * | 2/2024 | Shin | H10K 59/1216 |
| 12,033,568 | B2 * | 7/2024 | Lim | G09G 3/32 |
| 12,039,934 | B2 * | 7/2024 | Komazawa | G09G 3/3233 |
| 12,057,067 | B2 * | 8/2024 | Wang | G02B 27/0172 |
| 12,075,541 | B2 * | 8/2024 | Igarashi | G09G 3/3266 |
| 12,112,706 | B2 * | 10/2024 | Yanase | G09G 3/3241 |
| 12,148,372 | B2 * | 11/2024 | Zhang | G09G 3/3233 |
| 2005/0121744 | A1 | 6/2005 | Chang et al. | |
| 2005/0243038 | A1 | 11/2005 | Kwak | |
| 2007/0152295 | A1 | 7/2007 | Yeh et al. | |
| 2008/0316150 | A1 | 12/2008 | Lee et al. | |
| 2010/0079419 | A1 * | 4/2010 | Shibusawa | H10K 59/126 345/204 |
| 2013/0043802 | A1 * | 2/2013 | Han | G09G 3/3233 315/240 |
| 2014/0347347 | A1 * | 11/2014 | Jeong | G09G 3/3233 345/82 |
| 2015/0144892 | A1 | 5/2015 | Chang et al. | |
| 2015/0145849 | A1 * | 5/2015 | Choi | G09G 3/3233 345/212 |
| 2015/0371590 | A1 * | 12/2015 | Jeong | G09G 3/3291 345/82 |
| 2016/0104424 | A1 * | 4/2016 | Lim | G09G 3/3258 345/76 |
| 2016/0155387 | A1 * | 6/2016 | Kim | G09G 3/3291 345/76 |
| 2016/0163267 | A1 | 6/2016 | Yang | |
| 2017/0124941 | A1 * | 5/2017 | Na | G09G 3/2092 |
| 2017/0132975 | A1 * | 5/2017 | Park | G09G 3/3233 |
| 2017/0200414 | A1 * | 7/2017 | Li | G09G 3/3266 |
| 2018/0301092 | A1 * | 10/2018 | Ma | G09G 3/3258 |
| 2018/0357960 | A1 | 12/2018 | Yang et al. | |
| 2019/0019458 | A1 * | 1/2019 | Teraguchi | H10K 59/123 |
| 2020/0126481 | A1 * | 4/2020 | Tsuboi | H10K 59/1213 |
| 2020/0135826 | A1 * | 4/2020 | Tsuboi | H10D 30/6715 |
| 2020/0143740 | A1 * | 5/2020 | Tsuboi | G09G 3/3233 |
| 2020/0184893 | A1 * | 6/2020 | Dong | G09G 3/3233 |
| 2020/0211477 | A1 | 7/2020 | Lai et al. | |
| 2021/0111227 | A1 * | 4/2021 | Tsuboi | H10K 59/1213 |
| 2021/0174739 | A1 | 6/2021 | Lu et al. | |
| 2021/0242292 | A1 * | 8/2021 | Tsuboi | H10D 30/601 |
| 2021/0318733 | A1 * | 10/2021 | Kong | H10D 86/60 |
| 2021/0384280 | A1 * | 12/2021 | Akiyama | G06F 1/1626 |
| 2022/0172679 | A1 * | 6/2022 | Akiyama | G09G 3/3233 |
| 2022/0173190 | A1 * | 6/2022 | Tsuboi | H10K 59/1216 |
| 2022/0230585 | A1 * | 7/2022 | Komazawa | G09G 3/3233 |
| 2023/0005421 | A1 * | 1/2023 | Sakaguchi | G09G 3/3233 |
| 2023/0154403 | A1 * | 5/2023 | Kang | H10K 59/121 345/211 |
| 2023/0351955 | A1 * | 11/2023 | Zhang | G09G 3/3233 |
| 2024/0381696 | A1 | 11/2024 | Sakaguchi et al. | |

FOREIGN PATENT DOCUMENTS

| | | | |
|---|---|---|---|
| CN | 109523951 | A | 3/2019 |
| CN | 110416107 | A | 11/2019 |
| CN | 114335128 | A | 4/2022 |
| WO | WO2020210932 | A1 | 10/2020 |
| WO | WO 2022/230578 | A1 | 11/2022 |

OTHER PUBLICATIONS

Extended European Search Report in corresponding EP Application No. 22968814.8, dated May 13, 2025, in 9 pgs.

Sabine, K., "Using Deep N Wells in Analog Design—Planet Analog", May 7, 2015, pp. 1-6, XP093273375, retrieved from the internet: https://www.planetanalog.com/using-deep-n-wells-in-analog-design/.

Lienig, J., "Chapter 6: Special Layout Techniques for Analog IC Design", Fundamentals of Layout Design for Electronic Circuits, Springer Jun. 6, 2020, pp. 1-36, XP093273379.

* cited by examiner

DISPLAY SUBSTRATE AND DISPLAY APPARATUS

CROSS-REFERENCE TO RELATED APPLICATION

The present application is a national phase entry under 35 USC 371 of International Patent Application No. PCT/CN2022/140139, filed on Dec. 19, 2022, which is incorporated herein by reference in its entirety.

TECHNICAL FIELD

The present disclosure relates to the field of display technologies, and in particular, to a display substrate and a display apparatus.

BACKGROUND

Organic light-emitting diodes (OLEDs) have been widely used in the field of display apparatus due to their properties such as self-luminescence, wide viewing angle, fast response, and capable of being fabricated on a flexible substrate.

SUMMARY

In an aspect, a display substrate is provided. The display substrate includes an array layer. The array layer includes a plurality of pixels, and a plurality of pixel driving circuits corresponding to the plurality of pixels. A pixel driving circuit includes a driving sub-circuit and a storage sub-circuit. The storage sub-circuit includes a first capacitor and a second capacitor connected in series. A first plate of the first capacitor is coupled to a first node, and a second plate of the first capacitor is coupled to a second node; a third plate of the second capacitor is coupled to the second node, and a fourth plate of the second capacitor is coupled to a first voltage signal terminal. The driving sub-circuit is coupled to the first node, the second node and a third node, and the driving sub-circuit is configured to generate a driving current under control of the storage sub-circuit and transmit the driving current to a light emitting device. In a direction perpendicular to the array layer, the first plate, the second plate, the third plate and the fourth plate have an overlapping region therebetween.

In some embodiments, the driving sub-circuit includes a driving transistor; a gate of the driving transistor is coupled to the first node, a first electrode of the driving transistor is coupled to the second node, and a second electrode of the driving transistor is coupled to the third node.

In some embodiments, the pixel driving circuit further includes a writing sub-circuit; the writing sub-circuit is coupled to a data signal terminal, a first scan signal terminal and the first node; the writing sub-circuit is configured to: transmit a first data signal received at the data signal terminal to the first node under control of a first scan signal received from the first scan signal terminal in an initialization period; and transmit a second data signal received at the data signal terminal under control of the first scan signal received from the first scan signal terminal in a data writing period.

In some embodiments, the writing sub-circuit includes a first transistor; a gate of the first transistor is coupled to the first scan signal terminal, a first electrode of the first transistor is coupled to the data signal terminal, and a second electrode of the first transistor is coupled to the first node.

In some embodiments, the pixel driving circuit further includes a light-emitting control sub-circuit. The light-emitting control sub-circuit is coupled to the first voltage signal terminal, a second scan signal terminal and the second node; the light-emitting control sub-circuit is configured to transmit a first voltage signal at the first voltage signal terminal to the second node under control of a second scan signal from the second scan signal terminal in an initialization period and a light-emitting period.

In some embodiments, the light-emitting control sub-circuit includes a second transistor; a gate of the second transistor is coupled to the second scan signal terminal, a first electrode of the second transistor is coupled to the first voltage signal terminal, and a second electrode of the second transistor is coupled to the second node.

In some embodiments, the pixel driving circuit further includes a reset sub-circuit. The reset sub-circuit is coupled to a third scan signal terminal, a second voltage signal terminal and the third node; the reset sub-circuit is configured to transmit a second voltage signal at the second voltage signal terminal to the third node under control of a third scan signal from the third scan signal terminal in a light-emitting period.

In some embodiments, the reset sub-circuit includes a third transistor; a gate of the third transistor is coupled to the third scan signal terminal, a first electrode of the third transistor is coupled to the second voltage signal terminal, and a second electrode of the third transistor is coupled to the third node.

In some embodiments, in a case where the pixel driving circuit includes a driving transistor, a first transistor, a second transistor and the third transistor, the array layer includes a silicon substrate, and a first source-drain metal layer and a first gate metal layer that are sequentially stacked on the silicon substrate. A first electrode and a second electrode of the first transistor, a first electrode and a second electrode of the second transistor, the first electrode and the second electrode of the third transistor, and a first electrode and a second electrode of the driving transistor are all located in the first source-drain metal layer. A gate of the first transistor, a gate of the second transistor, the gate of the third transistor, and a gate of the driving transistor are all located in the first gate metal layer.

In some embodiments, in a case where the pixel driving circuit includes a driving transistor, a first transistor, a second transistor and the third transistor, the first transistor, the second transistor and the driving transistor are P-type transistors; the first transistor, the second transistor and the driving transistor are all located in an N-well region of the silicon substrate.

In some embodiments, the third transistor is an N-type transistor; the third transistor is located in a deep N-well region of the silicon substrate.

In some embodiments, the deep N-well region includes a first doped region and a second doped region. Doped ions in the first doped region are N ions, and doped ions in the second doped region are P ions. The first doped region includes a first sub-region and a second sub-region, the first electrode of the third transistor is electrically connected to the first sub-region, and the second electrode of the third transistor is electrically connected to the second sub-region; the second doped region is electrically connected to the second voltage signal terminal.

In some embodiments, in a case where the pixel driving circuit includes a driving transistor, a first transistor, a second transistor and the third transistor, in a pixel of the plurality of pixels, in a first direction, a third transistor is located on a side of a driving transistor, and both a first transistor and a second transistor are located on another side of the driving transistor; the plurality of pixels include first pixels and second pixels alternately arranged in a second direction; in an adjacent first pixel and second pixel, a third transistor in the first pixel is arranged adjacent to a third transistor in the second pixel. The first direction and the second direction intersect.

In some embodiments, in the pixel, the first transistor and the second transistor are arranged in the second direction.

In some embodiments, in the adjacent first pixel and second pixel, a first electrode of the third transistor in the first pixel is coupled to a first electrode of the third transistor in the second pixel.

In some embodiments, in a previous first pixel, a second pixel and a next first pixel arranged in the second direction, a first transistor in the previous first pixel is arranged adjacent to a first transistor in the second pixel, and a second transistor in the second pixel is arranged adjacent to a second transistor in the next first pixel.

In some embodiments, a gate of the first transistor in the previous first pixel is coupled to a gate of the first transistor in the second pixel, and a gate of the second transistor in the second pixel is coupled to a gate of the second transistor in the next first pixel.

In some embodiments, the array layer further includes a first wiring metal layer and a second wiring metal layer; the first wiring metal layer is located between the second wiring metal layer and the first gate metal layer. The first wiring metal layer includes a second voltage signal line, a first scan signal line, a second scan signal line, and a third scan signal line that each extending in the second direction and are arranged in the first direction. In a case where the pixel driving circuit includes a first transistor, a second transistor and the third transistor, the second voltage signal line is coupled to the second voltage signal terminal and the first electrode of the third transistor, the first scan signal line is coupled to the first scan signal terminal and a gate of the first transistor, the second scan signal line is coupled to a second scan signal terminal and a gate of the second transistor, the second scan signal terminal is coupled to the gate of the second transistor, and the third scan signal line is coupled to the third scan signal terminal and the gate of the third transistor. The second wiring metal layer includes a data signal line extending in the first direction; the data signal line is coupled to the data signal terminal and a first electrode of the first transistor.

In some embodiments, the array layer includes a first capacitor metal layer, a second capacitor metal layer, a third capacitor metal layer, a fourth capacitor metal layer and a fifth capacitor metal layer. The first plate of the first capacitor is located in the fourth capacitor metal layer, the second plate of the first capacitor is located in the third capacitor metal layer, the third plate of the second capacitor is located in the second capacitor metal layer, and the fourth plate of the second capacitor is located in the first capacitor metal layer. The first plate of the first capacitor is electrically connected to a gate of a driving transistor in the pixel driving circuit through a first connection portion located in the fifth capacitor metal layer, and the fourth electrode of the second capacitor is electrically connected to the first voltage signal terminal.

In some embodiments, the display substrate further has first pixel regions and second pixel regions arranged alternately. A first pixel is located in a first pixel region, and a second pixel is located in a second pixel region. The plurality of pixel driving circuits include a first pixel driving circuit corresponding to the first pixel and a second pixel driving circuit corresponding to the second pixel. A first transistor, a second transistor, a third transistor and a driving transistor in the first pixel driving circuit are located in the first pixel region, and a first capacitor and a second capacitor in the first pixel driving circuit are located in the second pixel region. A first transistor, a second transistor, a third transistor and a driving transistor in the second pixel driving circuit are located in the second pixel region, and a first capacitor and a second capacitor in the second pixel driving circuit are located in the first pixel region.

In some embodiments, storage sub-circuits in two adjacent pixels in the first direction are arranged in a staggered manner, and storage sub-circuits in two adjacent pixels in the second direction are arranged in a staggered manner.

In another aspect, a display apparatus is provided. The display apparatus includes the display substrate according to any of the above embodiments.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
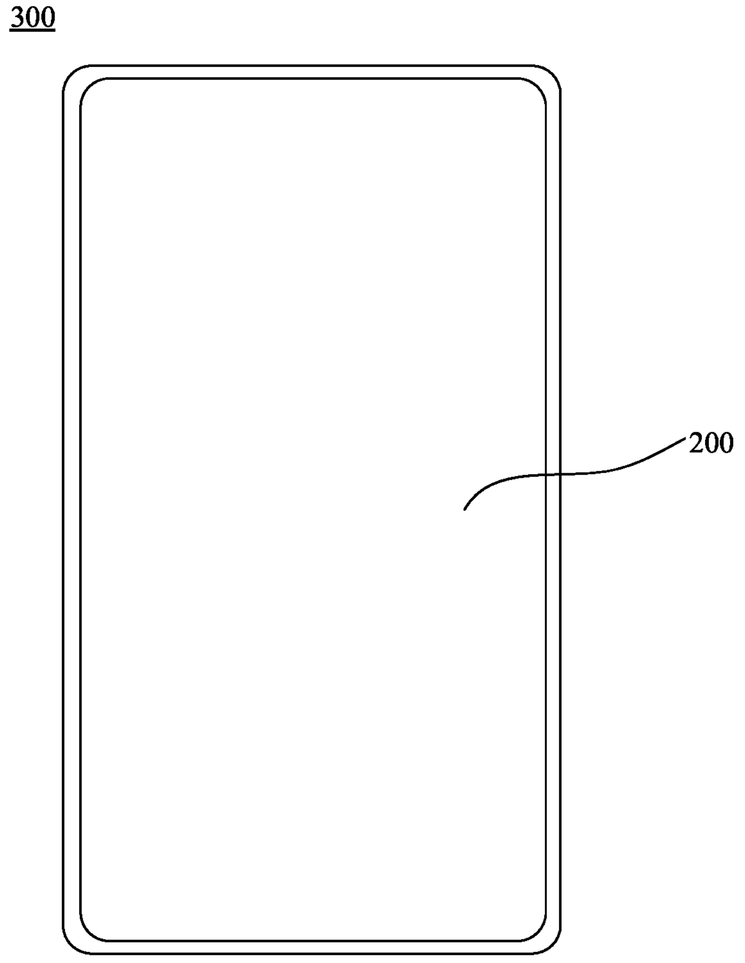
FIG. 1 is a structural diagram of a display apparatus, in accordance with some embodiments.

The technical solutions in embodiments of the present disclosure will be described clearly and completely with reference to the accompanying drawings. Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

Some embodiments may be described using the terms "coupled", "connected" and their derivatives. The term "connected" shall be understood in a broad sense. For example, the term "connected" may be a fixed connection, a detachable connection, or an integral connection; alternatively, the term "connected" may be a direct connection or an indirect connection through an intermediary. The term "coupled", for example, indicates that two or more components are in direct physical or electrical contact. The term "coupled" or "communicatively coupled" may also indicate that two or more components are not in direct contact with each other, but still cooperate or interact with each other. The embodiments disclosed herein are not necessarily limited to the context herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

As used herein, the term "if", depending on the context, is optionally construed as "when", "in a case where", "in response to determining that" or "in response to detecting". Similarly, depending on the context, the phrase "if it is determined that" or "if [a stated condition or event] is detected" is optionally construed as "in a case where it is determined that", "in response to determining that", "in a case where [the stated condition or event] is detected" or "in response to detecting [the stated condition or event]".

The phrase "configured to" used herein means an open and inclusive expression, which does not exclude devices that are applicable to or configured to perform additional tasks or steps.

In addition, the use of the phrase "based on" means openness and inclusiveness, since a process, step, calculation or other action that is "based on" one or more of the stated conditions or values may, in practice, be based on additional conditions or values exceeding those stated.

The term such as "substantially" as used herein includes a stated value and an average value within an acceptable range of deviation of a particular value determined by a person of ordinary skill in the art, considering measurement in question and errors associated with measurement of a particular quantity (i.e., limitations of a measurement system).

The term such as "parallel", "perpendicular" or "equal" as used herein includes a stated case and a case similar to the stated case within an acceptable range of deviation determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; and the term "equal" includes absolute equality and approximate equality, and an acceptable range of deviation of the approximate equality may be, for example, that a difference between two equals is less than or equal to 5% of either of the two equals.

It will be understood that, in a case where a layer or element is referred to as being on another layer or substrate, it may be that the layer or element is directly on the another layer or substrate, or it may be that intervening layer(s) exist between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including deviations due to, for example, manufacturing. For example, an etched region shown in a rectangular shape generally has a feature of being curved. Therefore, the regions shown in the accompanying drawings are schematic in nature, and their shapes are not intended to show actual shapes of the regions in an apparatus, and are not intended to limit the scope of the exemplary embodiments.

In circuit structures (e.g., a pixel driving circuit) provided in embodiments of the present disclosure, transistors used in the pixel driving circuit may be metal oxide semiconductor (MOS) transistors or other switching devices with same properties, and the embodiments of the present disclosure are described by considering the metal oxide semiconductor transistors as an example.

In the circuit structures provided by the embodiments of the present disclosure, a first electrode of each transistor is one of a source and a drain, and a second electrode of the transistor is the other one of the source and the drain. Since the source and the drain of the transistor may be symmetrical in structure, the source and the drain thereof may be indistinguishable in structure. That is, the first electrode and the second electrode of the transistor in the embodiments of the present disclosure may be indistinguishable in structure.

In the circuit structures provided in the embodiments of the present disclosure, the nodes such as the first node and the second node do not represent actual components, but rather represent junctions of related electrical connections in a circuit diagram. That is, these nodes are nodes equivalent to junctions of relevant electrical connections in the circuit diagram.

In the embodiments of the present disclosure, an "effective level" refers to a level that can enable a transistor to be turned on. The P-type transistor may be turned on under control of a low-level signal, and the N-type transistor may be turned on under control of a high-level signal. In the present disclosure, the P-type transistor may be turned on under control of a low-level signal, and the N-type transistor may be turned on under control of a high-level signal.

FIG. 1 is a structural diagram of a display apparatus, in accordance with some embodiments. With reference to FIG. 1, some embodiments of the present disclosure provide a display apparatus 300, and the display apparatus 300 includes a display panel 200.

In some examples, the display apparatus 300 may be an organic light-emitting diode (OLED) display apparatus.

For example, the display apparatus 300 further includes a frame, a display driver integrated circuit (IC) and other electronic components.

For example, the display apparatus 300 may be any device that can display images whether in motion (e.g., videos) or stationary (e.g., static images), and whether textual or graphical. More specifically, it is expected that the embodiments may be implemented in or associated with a plurality of electronic devices. The plurality of electronic devices may include (but is not limit to), for example, mobile telephones, wireless devices, personal data assistants (PAD), hand-held or portable computers, GPS receivers/navigators, cameras, MP4 video players, video cameras, game consoles, watches, clocks, calculators, TV monitors, flat panel displays, computer monitors, car displays (such as odometer displays, etc.), navigators, cockpit controllers and/or displays, camera view displays (such as rear view camera displays in vehicles), electronic photos, electronic billboards or indicators, projectors, building structures, packagings and aesthetic structures (such as a display for an image of a piece of jewelry) etc.

In some embodiments, the display panel 200 may be a silicon OLED micro display panel. The following will be described by taking an example in which the display panel 200 is a silicon OLED micro display panel.

The display panel 200 includes a silicon backplate (BP). The silicon backplate includes a display substrate 100, an oscillator (OSC), a gamma register, and an interface, which are integrated on a same chip using integrated circuit manufacturing technology. That is, the silicon backplate is a typical system-on-chip (SOC).

Since the analog part and the digital part are mixed on the same chip, the manufacturing process node of the chip is determined by the digital part with high requirements in the analog and digital parts. Most silicon backplates of the one chip mode use the integrated circuit manufacturing process with 0.11 um or less than 55 nm.

As the demand for large field of view (FOV) for virtual reality (VR) has increased, it has driven the demand for large size silicon OLED micro display panels from virtual reality manufacturers. The size of silicon OLED micro display panels has developed from small size such as 0.39 inch or 0.50 inch to the current mainstream 1 inch and above.

With the increase in the size of silicon OLED micro display panels, the number of silicon driver substrates manufactured from a piece of 12 inch wafer is reduced from a few hundred to a few dozen, and the cost of a single silicon driver substrate is increased by 5 to 10 times.

Therefore, for the large-size silicon backplate (BP) with high cost, it is considered to separate the analog part from the digital part, so that the silicon backplate of the one chip mode is changed into the silicon backplate of two chip mode. The size of the silicon backplate with two chip mode is smaller than that of the silicon backplate with one chip mode, and more wafers can be cut on a single 12 inch wafer, so that the cost is further reduced.

Figure 2:
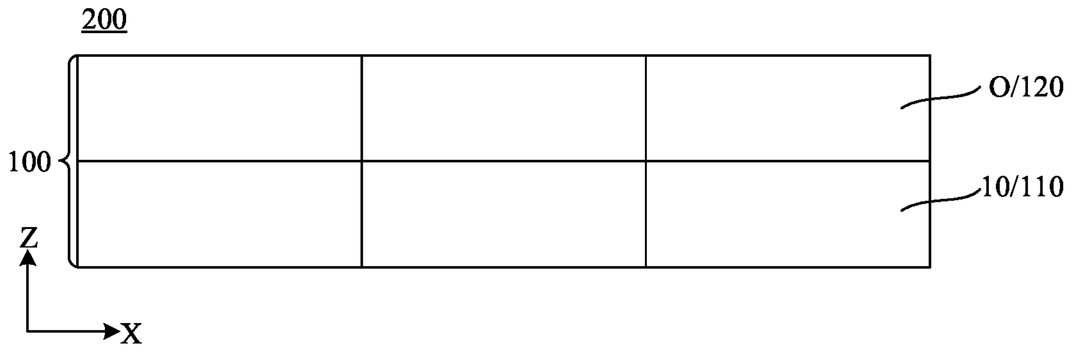
FIG. 2 is a structural diagram of a display substrate, in accordance with some embodiments.

FIG. 2 is a structural diagram of a display substrate, in accordance with some embodiments.

In some embodiments, referring to FIG. 2, the display panel 200 may include a display substrate 100. The display substrate 100 includes an array layer 110 and a light-emitting layer 120. The light-emitting layer 120 is located on a side of the array layer 110. The array layer 110 includes a plurality of pixel driving circuits 10 corresponding to a plurality of pixels. The light-emitting layer 120 may include a plurality of light-emitting devices O.

In some examples, the plurality of pixel driving circuits 10 and the plurality of light-emitting devices O may be coupled in one-to-one correspondence. In some other examples, one pixel driving circuit 10 may be coupled to multiple light-emitting devices O, or multiple pixel driving circuits 10 may be coupled to one light emitting device O.

For example, in the display substrate 100, the pixel driving circuit 10 may generate a driving current. Each light-emitting device O can emit light due to the driving action of the driving current generated by the corresponding pixel driving circuit 10, and the lights emitted by the multiple light-emitting devices O cooperate with each other to achieve the display function of the display substrate 100, i.e., the display function of the display panel 200.

For example, the above light-emitting device O may be an OLED light-emitting device.

Figure 3:
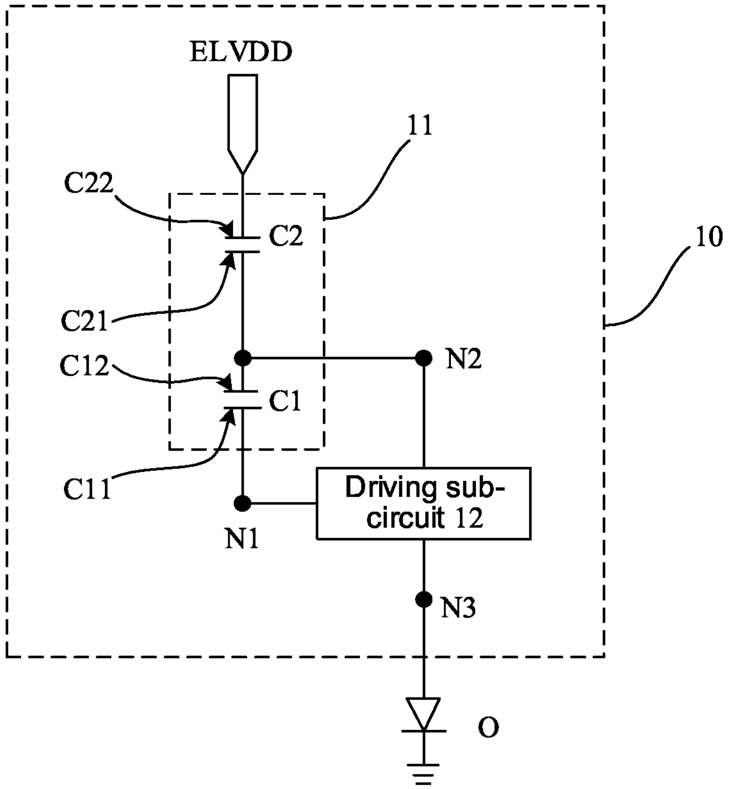
FIG. 3 is an equivalent circuit diagram of a pixel driving circuit, in accordance with some embodiments.

FIG. 3 is a structural diagram of a pixel driving circuit, in accordance with some embodiments.

As shown in FIG. 3, the pixel driving circuit 10 in some embodiments of the present disclosure includes a driving sub-circuit 12 and a storage sub-circuit 11.

The driving sub-circuit 12 is coupled to a first node N1, a second node N2 and a third node N3. The driving sub-circuit 12 is configured to generate a driving current under the control of the storage sub-circuit 11; the third node N3 is used for transmitting the driving current to the light-emitting device O. The light-emitting device O receives the driving current to emit light.

The storage sub-circuit 11 includes a first capacitor C1 and a second capacitor C2 connected in series. The first capacitor C1 includes a first plate C11 and a second plate C12, and the second capacitor C2 includes a third plate C21 and a fourth plate C22. The first plate C11 of the first capacitor C1 is coupled to the first node N1, and a second plate C12 of the first capacitor C1 is coupled to the second node N2. The third plate C21 of the second capacitor C2 is coupled to the second node N2, and the fourth plate C22 of the second capacitor C2 is coupled to the first voltage signal terminal ELVDD.

It will be understood that, with the above arrangement, the voltage difference between the two ends of the capacitor in the storage sub-circuit 11 is constant. The voltage difference between the two ends of the first capacitor C1 is constant, that is, the voltage difference between the first plate C11 and the second plate C12 of the first capacitor C1 is constant. The voltage difference between the two ends of the second capacitor C2 is constant, that is, the voltage difference between the third plate C21 and the fourth plate C22 of the second capacitor C2 is constant. Moreover, the voltage difference between the first plate C11 of the first capacitor C1 and the fourth plate C22 of the second capacitor C2 is constant.

Based on this, in an initialization period, the first node N1 receives a first data signal, and the first data signal is used to initialize the driving sub-circuit 12.

The first node N1 writes the first data signal into the first plate C11 of the first capacitor C1. Meanwhile, the fourth plate C22 of the second capacitor C2 is coupled to a first voltage signal terminal ELVDD, and the first voltage signal terminal ELVDD provides a first voltage signal. In this case, the first voltage signal is written into the fourth plate C22 of the second capacitor C2. Since the second plate C12 of the first capacitor C1 is coupled to the third plate C21 of the second capacitor C2, the voltage difference between the first plate C11 of the first capacitor C1 and the fourth plate C22 of the second capacitor C2 that are in the storage sub-circuit 11, the voltage difference between the first plate C11 and the second plate C12 of the first capacitor C1 that are in the storage sub-circuit 11, and the voltage difference between the third plate C21 and the fourth plate C22 of the second capacitor C2 that are in the storage sub-circuit 11 are obtained.

In a self-discharge threshold voltage reading period, i.e., after the initialization period, a threshold voltage of the driving sub-circuit 12 is obtained, and the threshold voltage is written into the first capacitor C1.

For example, in the self-discharge threshold voltage reading period, the driving sub-circuit 12 leaks current until the driving sub-circuit 12 is turned off, and the threshold voltage of the driving sub-circuit 12 is obtained. Moreover, since the first plate C11 of the first capacitor C1 is coupled to the driving sub-circuit 12 through the first node N1, and the second plate C12 of the first capacitor C1 is coupled to the driving sub-circuit 12 through the second node N2, the threshold voltage of the driving sub-circuit 12 can be written into the first capacitor C1.

In a data writing period, the first node N1 receives a second data signal, the second data signal is written into the driving sub-circuit 12, and the second data signal is written into the first plate C11 of the first capacitor C1. Based on the principle of constant voltage difference between two ends of a capacitor, when a voltage signal received by the first plate C11 of the first capacitor C1 changes, the second plate C12 of the first capacitor C1 also changes accordingly, and the voltage of the second node N2 may be adjusted accordingly. In this case, a gate-source voltage of the driving sub-circuit 12 may be written into the storage sub-circuit 11.

For example, when the voltage received by the first plate C11 of the first capacitor C1 increases, the voltage of the second plate C12 of the first capacitor C1 also increases accordingly. That is, when the voltage of the first node N1 increases, based on the control of the storage sub-circuit 11, the voltage of the second node N2 increases accordingly. Thus, the gate-source voltage of the driving sub-circuit 12 is obtained through the difference between the first node N1 and the second node N2, and the gate-source voltage of the driving sub-circuit 12 may be written into the storage sub-circuit 11.

In a light-emitting period, the first voltage signal provided by the first voltage signal terminal ELVDD will be written into the second node N2. Based on the principle of constant voltage difference between two ends of a capacitor in the storage sub-circuit 11, the voltage of the first node N1 may be adjusted based on the voltage of the second node N2, so that the first node N1 may enable the driving sub-circuit 12 to be turned on. That is, the driving sub-circuit 12 may be turned on under the adjustment control of the storage sub-circuit 11, and generate a driving current for driving the light-emitting device O. The driving sub-circuit 12 transmits the driving current to the light-emitting device O through the third node N3. Based on this, the light-emitting device O may emit light after receiving the driving current.

However, the storage sub-circuit 11 in the pixel driving circuit 10 includes two capacitors, the two capacitors are the first capacitor C1 and the second capacitor C2 respectively, and each capacitor requires two plates.

Figure 4:
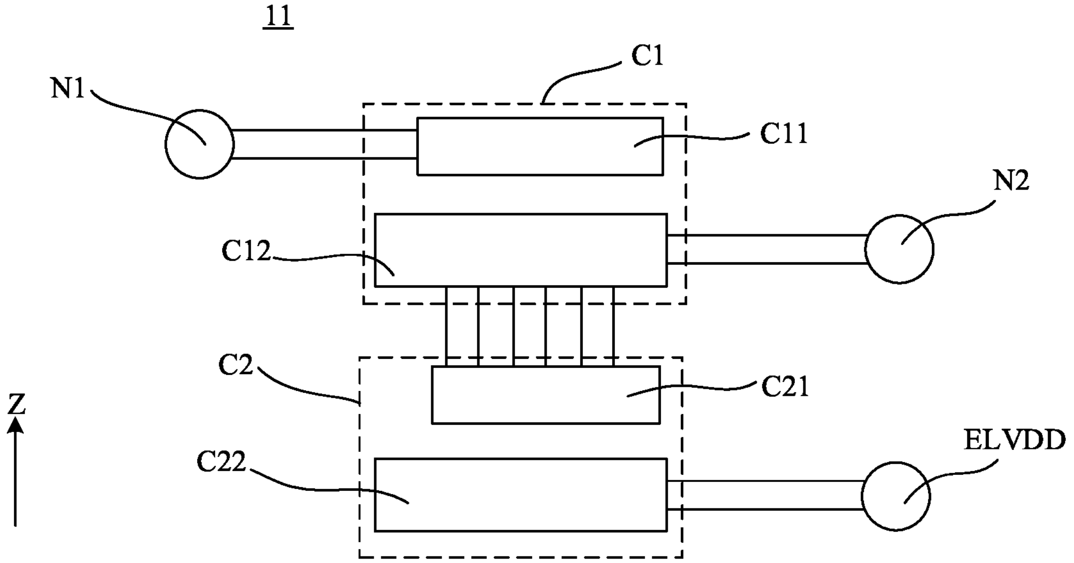
FIG. 4 is a structural diagram of a storage sub-circuit, in accordance with some embodiments.

FIG. 4 is a structural diagram of a storage sub-circuit, in accordance with some embodiments.

In the display substrate 100 provided by the embodiments of the present disclosure, as shown in FIG. 4, the first capacitor C1 and the second capacitor C2 in the storage sub-circuit 11 in the pixel driving circuit 10 are both stacked metal-insulator-metal (MIM) capacitors. Moreover, in a direction Z perpendicular to the array layer 110, the first capacitor C1 and the second capacitor C2 overlap at least partially. For example, in the direction Z perpendicular to the array layer 110, the first plate C11, the second plate C12, the third plate C21 and the fourth plate C22 have an overlapping region therebetween.

Thus, it may be possible to make full use of a space in the pixel P in the direction Z perpendicular to the array layer 110 to arrange the storage sub-circuit 11s to save a space occupied by the storage sub-circuit 11 in the pixel P in a direction parallel to the array layer 110, so that the pixel pitch may be compressed to the greatest extent and the pixel PPI is effectively increased, which is conductive to the improve the display effect of the display substrate 100.

Nodes such as the first node and the second node do not represent actual components, but represent junction points of related couplings in circuit diagrams. That is, these nodes are nodes equivalent to junctions of relevant couplings in the circuit diagram. In FIG. 4, in order to illustrate the electrical connection relationship between the storage sub-circuit 11 and the first node N1, the second node N2 and the first voltage signal terminal ELVDD, the positions of the first node N1, the second node N2 and the first voltage signal terminal ELVDD are shown. These positions does not refer to all the nodes, respectively, but may be specifically understood that a connection portion leaded out from the respective position is coupled to the respective node.

In some examples, as shown in FIG. 4, in the direction Z perpendicular to the array layer 110, the first capacitor C1 and the second capacitor C2 coincide substantially. Thus, it is possible to fully utilize the space in the pixel P in the direction Z perpendicular to the array layer 110 to arrange the storage sub-circuit 11 to save the space occupied by the storage sub-circuit 11 in the pixel P in the direction parallel to the array layer 110, so that the pixel pitch may be compressed to the greatest extent and the pixel PPI is effectively increased, which is conductive to the improve the display effect of the display substrate 100.

It will be noted that, "coincide substantially" includes absolute coincidence and approximate coincidence. That is, a range of deviation of a gap, in the direction Z parallel to the array layer 110, between the first capacitor C1 and the second capacitor C2 does not exceed an error threshold, and it may also be considered that the edges of the two capacitors may be relatively "coincident". The specific value of the error threshold is not limited in the present disclosure.

Figure 5:
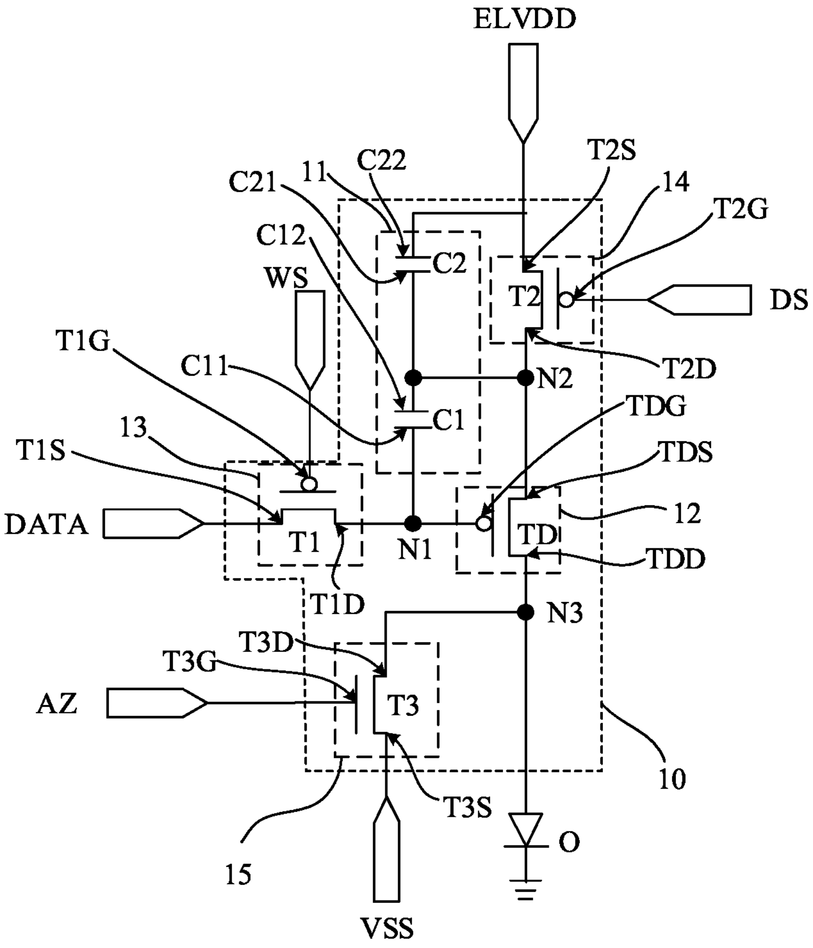
FIG. 5 is an equivalent circuit diagram of another pixel driving circuit, in accordance with some embodiments.

FIG. 5 is a structural diagram of another pixel driving circuit, in accordance with some embodiments.

In some other examples, as shown in FIG. 5, the driving sub-circuit 12 in the pixel driving circuit 10 includes a driving transistor TD. A gate TDG of the driving transistor TD is coupled to the first node N1, a first electrode TDS of the driving transistor TD is coupled to the second node N2, and a second electrode TDD of the driving transistor TD is coupled to the third node N3.

Based on this, in the data writing period, the first capacitor C1 and the second capacitor C2 in the storage sub-circuit 11 may adjust the voltage difference between the gate TDG of the driving transistor TD and the first electrode of the driving transistor TD. That is, for the gate TDG of the driving transistor TD, the potential received in the data writing period increases relative to the potential received in the initialization period. In this case, the capacitive coupling in the storage sub-circuit 11 may be used to adjust the potential of the first electrode TDS of the driving transistor TD to increase correspondingly. In this case, a voltage difference between the gate TDG of the driving transistor TD and the first electrode TDS of the driving transistor TD may be obtained; that is, the gate-source voltage of the driving transistor TD may be obtained. Moreover, the gate-source voltage of the driving sub-circuit 12 may be written into the storage sub-circuit 11.

For example, the first electrode TDS of the driving transistor TD may be the source of the driving transistor TD, and the second electrode TDD of the driving transistor TD may be the drain of the driving transistor TD.

In some embodiments, as shown in FIG. 5, the pixel driving circuit 10 further includes a light-emitting control sub-circuit 14.

The light-emitting control sub-circuit 14 is coupled to the first voltage signal terminal ELVDD, a second scan signal terminal DS and the second node N2; the light-emitting control sub-circuit 14 is configured to transmit the first voltage signal at the first voltage signal terminal ELVDD to the second node N2 under control of a second scan signal from the second scan signal terminal DS in the initialization period and the light-emitting period.

Based on this, in the initialization period, the first node N1 receives the first data signal, writes the first data signal into the gate TDG of the driving transistor TD to reset the gate TDG of the driving transistor TD, so as to improve the stability of the driving transistor TD. Moreover, the light-emitting control sub-circuit 14 is turned on under the control of the second scan signal from the second scan signal terminal DS, and transmit the first voltage signal at the first voltage signal terminal ELVDD to the second node N2, so that the first voltage signal is written into the second node N2.

In the self-discharge threshold voltage reading period, i.e., after the initialization period, the light-emitting control sub-circuit 14 is turned off under the control of the second scan signal from the second scan signal terminal DS. The first electrode TDS of the driving transistor TD is in a floating state. In this case, since the first data signal is written into the gate TDG of the driving transistor TD in the previous period, i.e., the initialization period, the driving transistor TD remains in a turn-on state, and the first electrode TDS of the driving transistor TD leaks current to the second electrode TDD of the driving transistor TD. Furthermore, the potential of the first electrode TDS of the driving transistor TD gradually decreases, and the potential of the gate TDG of the driving transistor TD is adjusted to decrease accordingly, due to the function of the storage sub-circuit 11, until the driving transistor TD is turned off; and moreover, the threshold voltage of the driving transistor TD is obtained, and the threshold voltage of the driving transistor TD is written into the first capacitor C1.

In the light-emitting period, the light-emitting control sub-circuit 14 is turned on under the control of the second scan signal from the second scan signal terminal DS, and transmit the first voltage signal at the first voltage signal terminal ELVDD to the second node N2. In this case, based on the gate-source voltage of the driving transistor TD stored by the storage sub-circuit 11 in the data writing period, and the function of capacitive coupling, the voltage at the first node N1 may be adjusted according to the change of the voltage at the second node N2, so that the driving transistor TD may be turned on under the driving of the first node N1, and transmit the driving current to the light-emitting device O, to enable the light-emitting device O to emit light.

In some embodiments, as shown in FIG. 5, the light-emitting control sub-circuit 14 includes a second transistor T2. A gate T2G of the second transistor T2 is coupled to the second scan signal terminal DS, a first electrode T2S of the second transistor T2 is coupled to the first voltage signal terminal ELVDD, and a second electrode T2D of the second transistor T2 is coupled to the second node N2.

Based on this, the gate T2G of the second transistor T2 receives the second scan signal from the second scan signal terminal DS to be turned on or off.

In the initialization period, the gate T2G of the second transistor T2 is turned on after receiving the effective signal from the second scan signal terminal DS, so that the first voltage signal provided by the first voltage signal terminal ELVDD is transmitted to the second node N2.

In the self-discharge threshold voltage reading period, the gate T2G of the second transistor T2 is turned off after receiving an ineffective signal from the second scanning signal terminal DS. In this case, the first voltage signal provided by the first voltage signal terminal ELVDD cannot be transmitted to the second node N2, so that the first electrode TDS of the driving transistor TD is in a floating state.

In the light-emitting period, the gate T2G of the second transistor T2 is turned on after receiving the effective signal from the second scan signal terminal DS, so that the first voltage signal provided by the first voltage signal terminal ELVDD is transmitted to the second node N2. Furthermore, the second transistor T2 cooperate with the storage sub-circuit 11 and the driving sub-circuit 12 to transmit the driving current to the light-emitting device O.

It will be noted that, the "effective signal" in the present disclosure refers to a signal that can enable a transistor to be turned on. In a case where the transistor is an N-type transistor, the "effective signal" is a high level signal; in a case where the transistor is a P-type transistor, the "effective signal" is a low level signal. The "effective signal" in the following embodiments is the same as the above, and will not be repeated.

In some embodiments, as shown in FIG. 5, the pixel driving circuit 10 further includes a writing sub-circuit 13. The writing sub-circuit 13 is coupled to a data signal terminal DATA, a first scan signal terminal WS and the first node N1.

The writing sub-circuit 13 is configured to transmit a first data signal received at the data signal terminal DATA to the first node N1 under control of a first scan signal received at the first scan signal terminal WS in the initialization period.

Based on this, in the initialization period, the writing sub-circuit 13 is turned on under the control of the first scan signal received from the first scan signal terminal WS, and transmit the first data signal received at the data signal terminal DATA to the first node N1, so that the first data signal is used to initialize the gate TDG of the driving transistor TD. Thus, the initial state of the driving transistor TD is fixed before the data writing period, so that the driving transistor TD is in a stable state during the data writing period.

For example, the first data signal is a low level signal. The driving transistor TD is initialized with the low level signal.

In the data writing period, the writing sub-circuit 13 is turned on under the control of the first scan signal received at the first scan signal terminal WS, and transmit a second data signal received at the data signal terminal DATA to the first node N1. The second data signal is written into the first plate C11 of the first capacitor C1. Based on the principle of constant voltage difference between two ends of a capacitor, when the voltage signal received by the first plate C11 of the first capacitor C1 increases, the voltage of the second plate C12 of the first capacitor C1 also increases accordingly. In this case, the gate-source voltage of the driving transistor TD may be obtained according to the voltages of the first node N1 and the second node N2, and the gate-source voltage of the driving transistor TD may be written into the storage sub-circuit 11. In the subsequent light-emitting period, the voltage of the first node N1 is adjusted by using the coupling effect of the first capacitor C1 and the second capacitor C2, so that the driving transistor TD is turned on to generate the driving current.

For example, the second data signal is a high level signal, and the high level signal is written into the first node N1.

In some embodiments, as shown in FIG. 5, the writing sub-circuit 13 in the pixel driving circuit 10 includes a first transistor T1. A gate T1G of the first transistor T1 is coupled to the first scan signal terminal WS, a first electrode T1S of the first transistor T1 is coupled to the data signal terminal DATA, and a second electrode T1D of the first transistor T1 is coupled to the first node N1.

Based on this, in the initialization period, the first transistor T1 is turned on under the control of the first scan signal received at the first scan signal terminal WS, and transmit the first data signal received at the data signal terminal DATA to the first node N1.

In the data writing period, the first transistor T1 is turned on under the control of the first scan signal received at the first scan signal terminal WS, and transmit the second data signal received at the data signal terminal DATA to the first node N1.

In some embodiments, as shown in FIG. 5, the pixel driving circuit 10 further includes a reset sub-circuit 15. The reset sub-circuit 15 is coupled to a third scan signal terminal AZ, a second voltage signal terminal VSS and the third node N3.

The reset sub-circuit 15 is configured to transmit a second voltage signal from the second voltage signal terminal VSS to the third node N3 under control of a third scan signal from the third scan signal terminal AZ in the initialization period.

Based on this, in the initialization period, the reset sub-circuit 15 is turned on under the control of the third scan signal from the third scan signal terminal AZ, and transmits the second voltage signal from the second voltage signal terminal VSS to the third node N3. The second voltage signal at the third node N3 is used to reset a first electrode of the light-emitting device O, so as to improve the stability of the light-emitting device O.

In some examples, in the initialization period, self-discharge threshold voltage reading period, and data writing period, the reset sub-circuit 15 is turned on under the control of the third scan signal from the third scan signal terminal AZ, and transmits the second voltage signal at the second voltage signal terminal VSS to the third node N3. The second voltage signal at the third node N3 is used to reset the first electrode of the light-emitting device O. That is, before the light-emitting period, the reset sub-circuit 15 may be used to reset the first electrode of the light-emitting device O, so as to improve the stability of the light-emitting device O.

For example, the first electrode of the light-emitting device O may be the anode of the light-emitting device O. The anode of the light-emitting device O is coupled to the third node. The second electrode of the light-emitting device O may be the cathode of the light-emitting device O, and the cathode of the light-emitting device O may be coupled to a low voltage signal terminal.

In some embodiments, as shown in FIG. 5, the reset sub-circuit 15 in the pixel driving circuit 10 includes a third transistor T3. A gate T3G of the third transistor T3 is coupled to the third scan signal terminal AZ, a first electrode T3S of the third transistor T3 is coupled to the second voltage signal terminal VSS, and a second electrode T3D of the third transistor T3 is coupled to the third node N3.

Based on this, in the light-emitting period, the gate T3G of the third transistor T3 is turned on after receiving the third scan signal from the third scan signal terminal AZ, and transmits the second voltage signal at the second voltage signal terminal VSS to the third node N3, so that the first electrode of the light-emitting device O is reset by using the second voltage signal at the third node N3, so as to improve the stability of the light-emitting device O.

For example, the second voltage signal is a low level signal.

In some embodiments, as shown in FIG. 5, the pixel driving circuit 10 includes a storage sub-circuit 11, a driving sub-circuit 12, a writing sub-circuit 13, a light-emitting control sub-circuit 14 and a reset sub-circuit 15.

The driving sub-circuit 12 includes a driving transistor TD. A gate TDG of the driving transistor TD is coupled to the first node N1, a first electrode TDS of the driving transistor TD is coupled to the second node N2, and a second electrode TDD of the driving transistor TD is coupled to the third node N3.

The storage sub-circuit 11 includes a first capacitor C1 and a second capacitor C2 connected in series. A first plate C11 of the first capacitor C1 is coupled to the first node N1, and a second plate C12 of the first capacitor C1 is coupled to the second node N2. The third plate C21 of the second capacitor C2 is coupled to the second node N2, and the fourth plate C22 of the second capacitor C2 is coupled to the first voltage signal terminal ELVDD.

The writing sub-circuit 13 includes a first transistor T1. A gate T1G of the first transistor T1 is coupled to the first scan signal terminal WS, a first electrode T1S of the first transistor T1 is coupled to the data signal terminal DATA, and a second electrode T1D of the first transistor T1 is coupled to the first node N1.

The light-emitting control sub-circuit 14 includes a second transistor T2. A gate T2G of the second transistor T2 is coupled to the second scan signal terminal DS, a first electrode T2S of the second transistor T2 is coupled to the first voltage signal terminal ELVDD, and a second electrode T2D of the second transistor T2 is coupled to the second node N2.

The reset sub-circuit 15 includes a third transistor T3. A gate T3G of the third transistor T3 is coupled to the third scan signal terminal AZ, a first electrode T3S of the third transistor T3 is coupled to the second voltage signal terminal VSS, and a second electrode T3D of the third transistor T3 is coupled to the third node N3.

Figure 6:
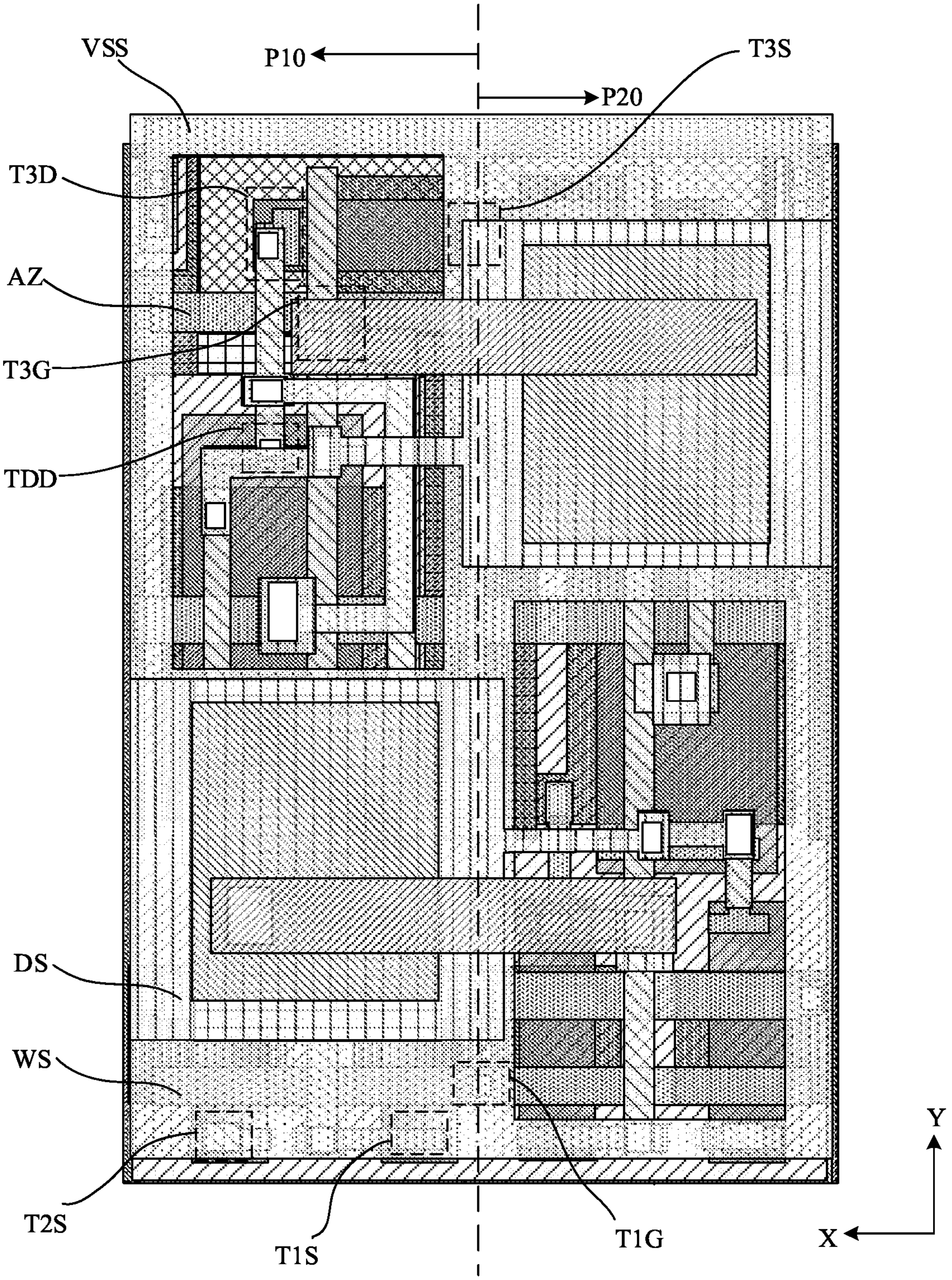
FIG. 6 is a structural diagram of film layers of pixel driving circuits in two adjacent pixels in a display substrate, in accordance with some embodiments.
Figure 7A:
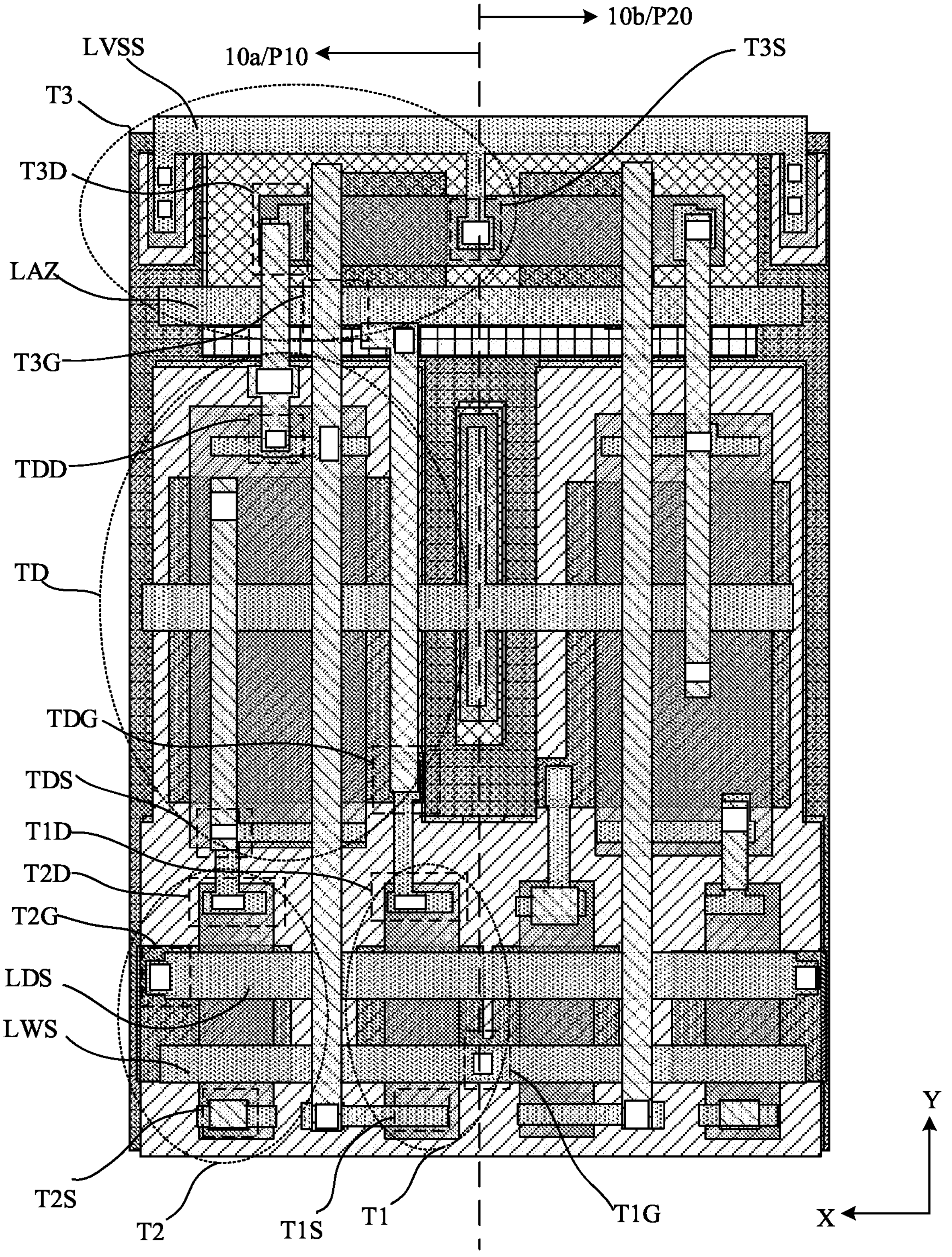
FIG. 7A is a structural diagram of some film layers in FIG. 6.
Figure 7B:
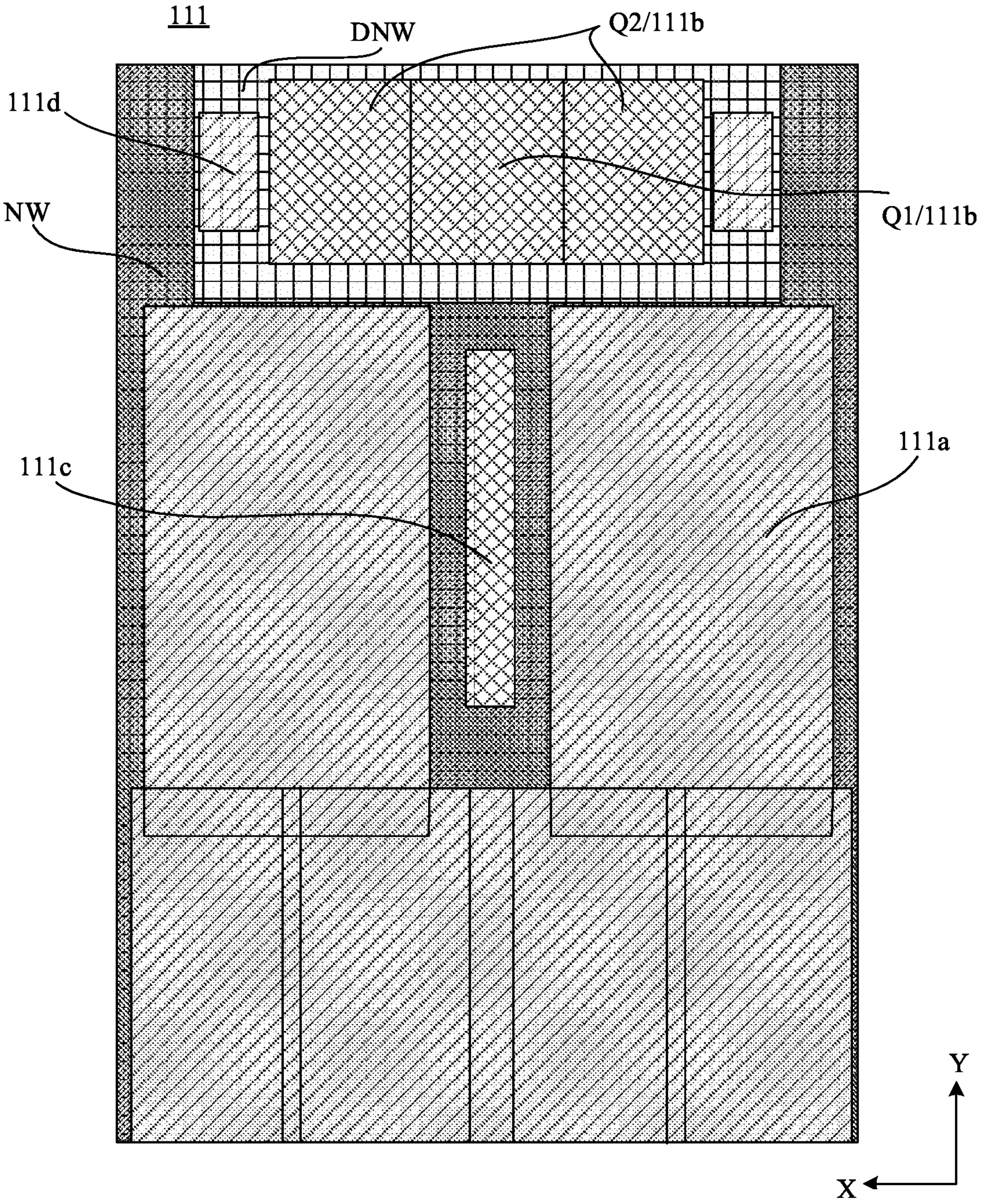
FIG. 7B is a structural diagram of a silicon substrate in FIG. 7A.

FIG. 6 is a structural diagram of film layers of pixel driving circuits in two adjacent pixels in a display substrate, in accordance with some embodiments. The equivalent circuit diagram corresponding to the pixel driving circuit in FIG. 6 is shown in FIG. 5. FIG. 7A is a structural diagram of film layers in FIG. 6. FIG. 7A only schematically shows all transistors in the pixel driving circuit. FIGS. 7B to 7D, FIG. 7F and FIG. 7G are structural diagrams of some film layers in FIG. 7A. FIG. 7E is a structural diagram of a gate metal layer in a second pixel and a next first pixel.

As shown in FIGS. 6 to 7E, the array layer 110 includes a silicon substrate 111, and a first source-drain metal layer M1 and a first gate metal layer M2 that are located on the silicon substrate 111. The first source-drain metal layer M1 is located between the silicon substrate 111 and the first gate metal layer M2.

The first electrode and second electrode of each transistor in the pixel driving circuit 10 are all located in the first source-drain metal layer M1. The gates of all the transistors in the pixel driving circuit 10 are all located in the first gate metal layer M2.

Figure 7C:
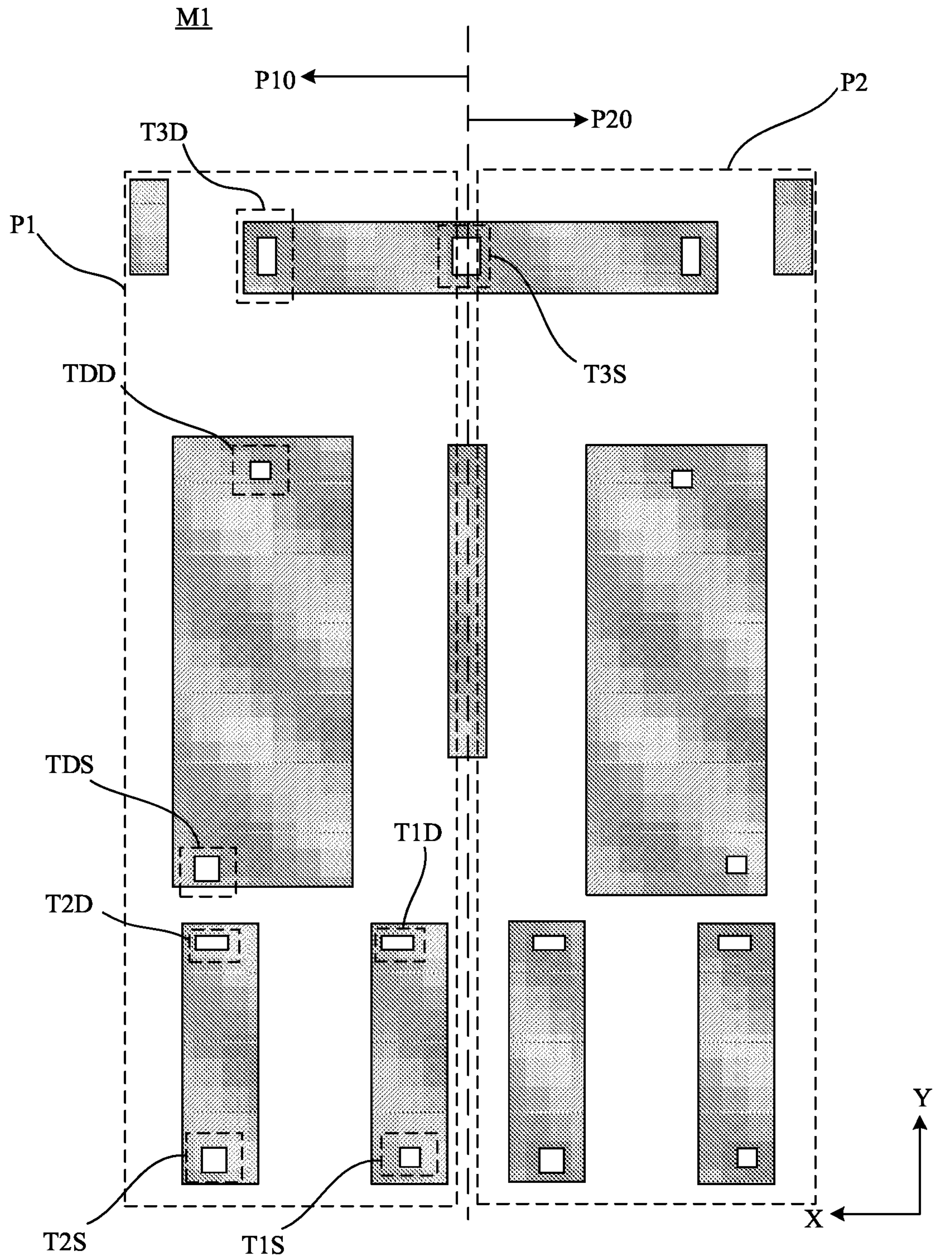
FIG. 7C is a structural diagram of a first source-drain metal layer in FIG. 7A.

As shown in FIG. 7C, the first electrode T1S and second electrode T1D of the first transistor T1, the first electrode T2S and second electrode T2D of the second transistor T2, the first electrode T3S and second electrode T3D of the third transistor T3, and the first electrode TDS and second electrode TDD of the driving transistor TD are all located in the first source-drain metal layer M1.

For example, a material of the first source-drain metal layer M1 includes conductive metal. The conductive metal includes at least one of aluminum, copper, or molybdenum, and the present disclosure is not limited thereto.

Figure 7D:
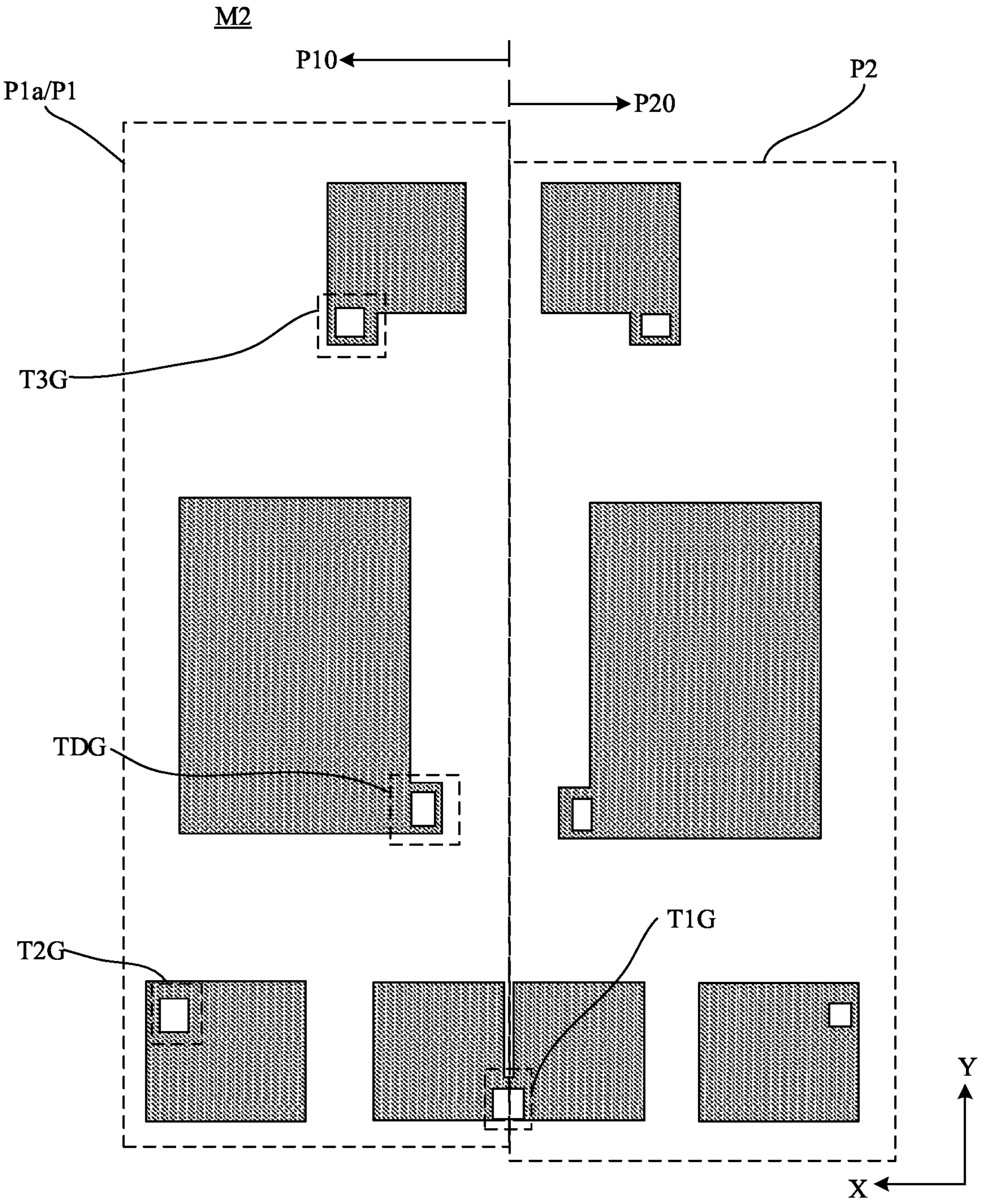
FIG. 7D is a structural diagram of a first gate metal layer in FIG. 7A.
Figure 7E:
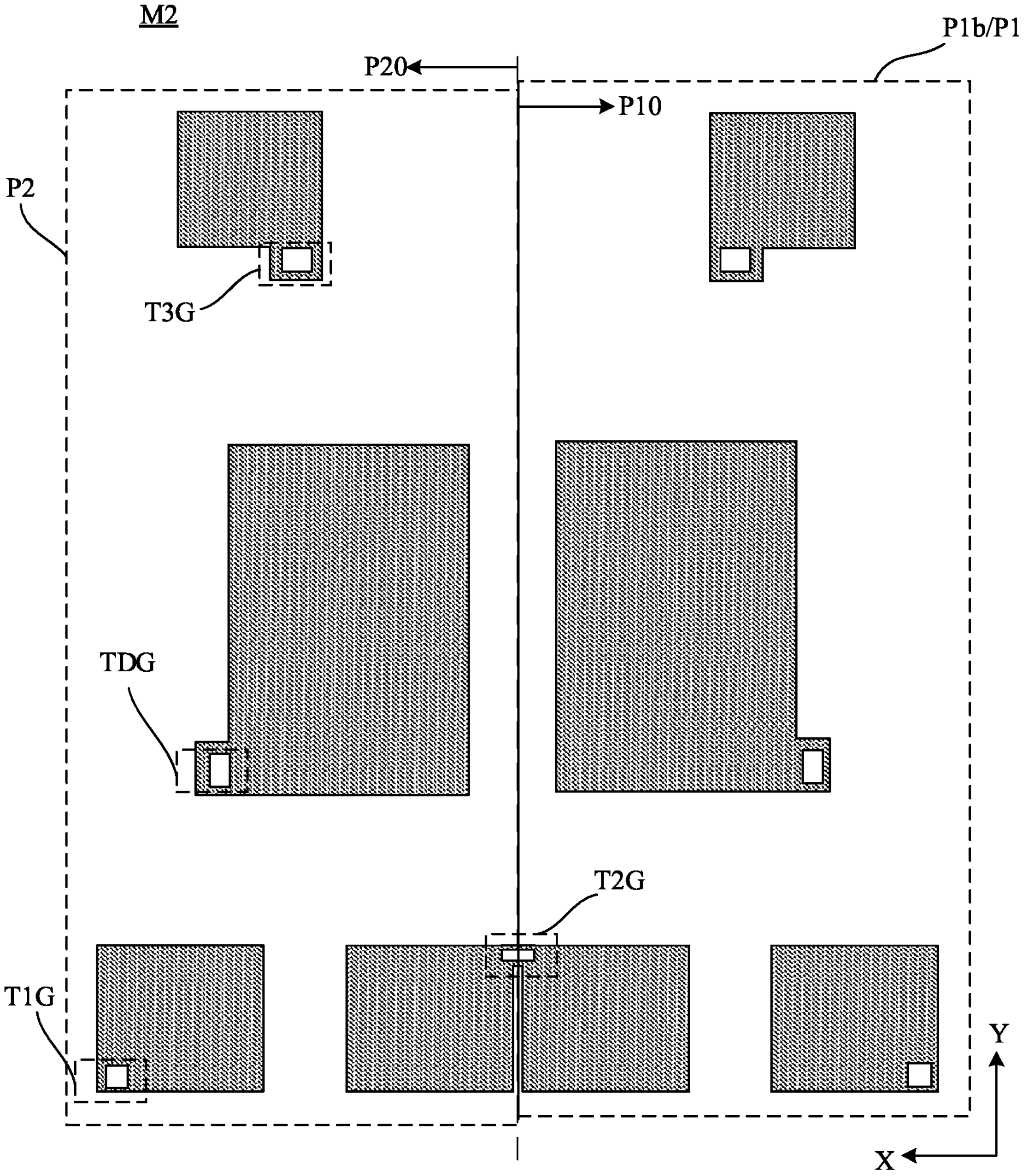
FIG. 7E is a structural diagram of a first gate metal layer in a second pixel and a next first pixel.

As shown in FIG. 7D, the gate T1G of the first transistor T1, the gate T2G of the second transistor T2, the gate T3G of the third transistor T3, and the gate TDG of the driving transistor TD are all located in the first gate metal layer M2.

For example, a material of the first gate metal layer M2 includes conductive metal. The conductive metal includes at least one of aluminum, copper, or molybdenum, and the present disclosure is not limited thereto.

In some embodiments, the array layer 110 further includes a first insulating layer. The first insulating layer is located between the first source-drain metal layer M1 and the first gate metal layer M2. The first insulating layer is used to insulate the first source-drain metal layer M1 from the first gate metal layer M2.

For example, a material of the first insulating layer includes any of inorganic insulating materials of silicon nitride, silicon oxynitride and silicon oxide. The material of the first insulating layer includes silicon dioxide, and the present disclosure is not limited thereto.

In some embodiments, as shown in FIG. 7B, the silicon substrate 111 includes an N-well region NW and a deep N-well region DNW.

The first transistor T1, the second transistor T2, and the driving transistor TD in the pixel driving circuit 10 are all P-type transistors. The first transistor T1, the second transistor T2 and the driving transistor TD are all located in the N-well region of the silicon substrate 111.

The first transistor T1, the second transistor T2 and the driving transistor TD are all arranged in the same well in the silicon substrate 111, which may avoid the problem that the gap between wells occupies too much space because each transistor is arranged in a single well. Furthermore, it is conducive to the centralized arrangement of various devices in the pixel, which is beneficial to reduce the size of the pixel, thereby facilitating the compression of the pixel pitch, and more effectively improving the PPI of the pixel. As a result, it is conducive to the improvement of the display effect of the display substrate 100.

The third transistor T3 in the pixel driving circuit 10 is an N-type transistor. The third transistor T3 is located in a deep N-well region DNW of the silicon substrate 111.

Multiple third transistors T3 are arranged in the same deep N-well region DNW, which may avoid the problem that the gap between wells occupies too much space because each transistor is arranged in a single well. Furthermore, it is conducive to the centralized arrangement of various devices in the pixel, which is beneficial to reduce the size of the pixel, thereby facilitating the compression of the pixel pitch, and more effectively improving the PPI of the pixel. As a result, it is conducive to the improvement of the display effect of the display substrate 100.

In some embodiments, the N-well region NW includes a plurality of first P ion-doped regions 111*a*. The first electrode and second electrode of the first transistor T1, the first electrode and second electrode of the second transistor T2, and the first electrode and second electrode of the driving transistor TD are respectively formed on each of the first P ion-doped regions 111*a*.

In some embodiments, as shown in FIG. 7B, the deep N-well region DNW includes a first doped region 111*b*. The first doped region 111*b* includes a first sub-region Q1 and a second sub-region Q2. The first electrode T3S of the third transistor T3 may be formed on the first sub-region Q1, so that the first electrode T3S of the third transistor T3 is electrically connected to the first sub-region Q1. The second electrode T3D of the third transistor T3 may be formed on the second sub-region Q2, so that the second electrode T3D of the third transistor T3 is electrically connected to the second sub-region Q2.

In order to prevent unnecessary interference due to the forward conduction of the N-well region NW for forming the P-type transistor and the deep N-well region DNW for forming the N-type transistor, it is generally necessary to apply a high level signal to the N-well region NW, and apply a low level signal to the deep N-well region DNW.

Figure 7F:
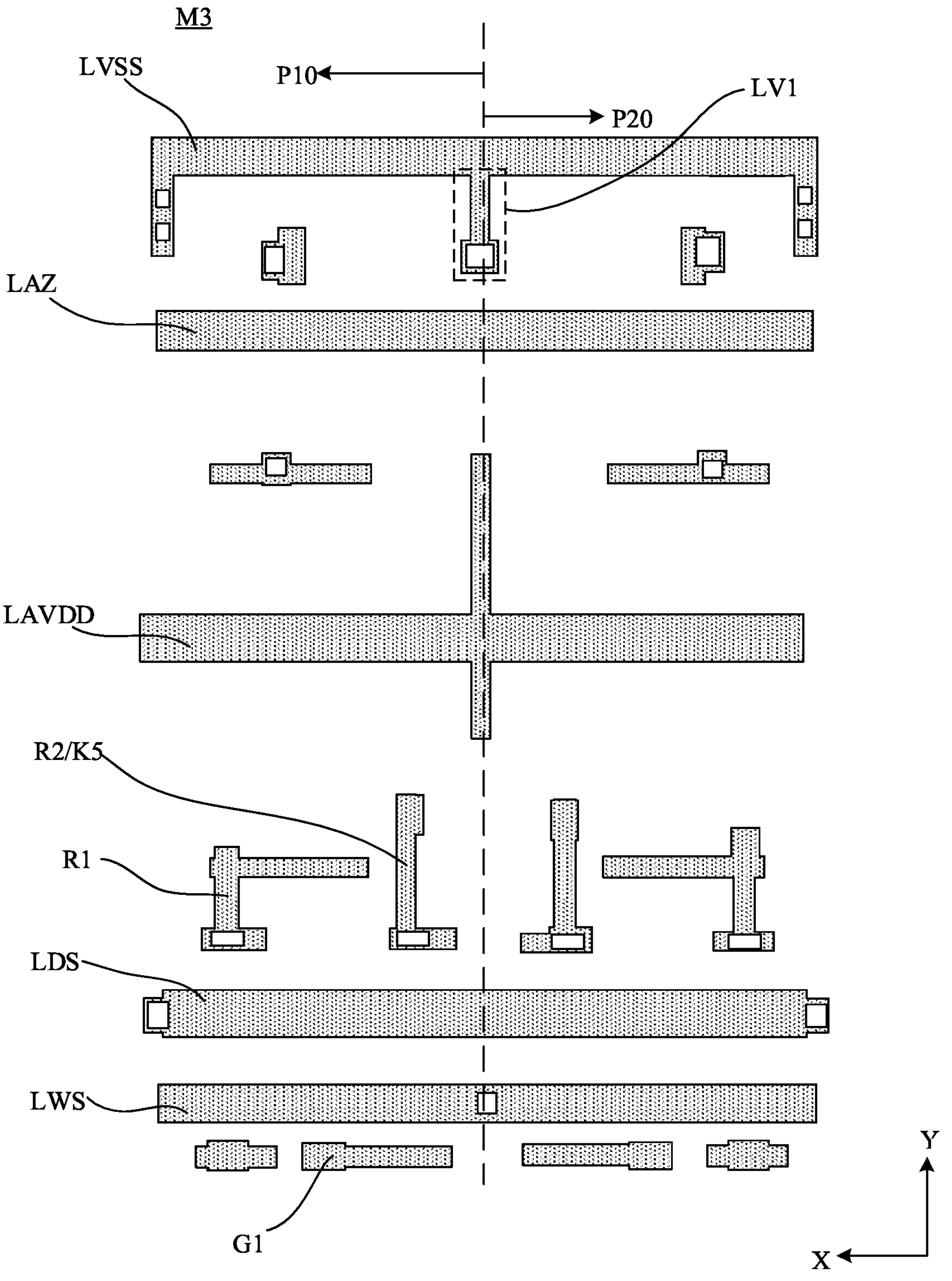
FIG. 7F is a structural diagram of a first wiring metal layer in FIG. 7A.

Further, a second N ion-doped region 111*c* may be formed in the N-well region NW, and the second N ion-doped region 111*c* is set to be coupled to the N-well region NW, and the second N ion-doped region 111*c* is also set to be coupled to a high level signal terminal AVDD (as shown in FIG. 7F), so that the N-well region NW acquires a high level signal from the high level signal terminal.

A second doped region 111*d* may be formed in the deep N-well region DNW, and doped ions in the second doped region are Pions. The second doped region 111*d* is set to be coupled to the deep N-well region DNW, and the second doped region 111*d* is also set to be coupled to a low level signal terminal, so that the deep N-well region DNW acquires a low level signal from the low level signal terminal.

In some examples, the first electrode of the third transistor T3 is coupled to the second voltage signal terminal VSS, and the second voltage signal terminal VSS is a low level signal terminal.

Based on this, the second voltage signal terminal VSS may be also used as the low level signal terminal. The second voltage signal terminal VSS is set to be electrically connected to the second doped region 111*d*, so that the second doped region 111*d* obtains a second voltage signal (a low level signal), so that the deep N-well region DNW obtains a low level voltage, thereby preventing unnecessary interference due to the forward conduction of the deep N-well region DNW and the N-well region NW.

In addition, since the second voltage signal terminal VSS may be also used as a low level signal terminal, there is no need to set a low level signal terminal in the pixel P, which may save the occupation of the pixel space by the low level signal terminal, thereby facilitating the compression of the pixel pitch to more effectively improve the PPI of the pixel. As a result, it is conducive to the improvement of the display effect of the display substrate 100.

In some embodiments, as shown in FIG. 7A, in a first direction Y, the third transistor T3 is located on a side of the driving transistor TD, and both the first transistor T1 and the second transistor T2 are located on the other side of the driving transistor TD.

The driving transistor TD needs to be electrically connected to the first transistor T1, the second transistor T2 and the third transistor T3. For example, the driving transistor TD may be electrically connected to the first transistor T1, the second transistor T2 and the third transistor T3 through different connection lines. Therefore, the first transistor T1, the second transistor T2 and the third transistor T3 are arranged on two sides of the driving transistor TD in the first direction Y, which facilitates the electrical connection of the driving transistor TD to the first transistor T1, the second transistor T2, and the third transistor T3, so as to prevent the connection lines from being wound, and reduce the occupancy of pixel space by the connection lines. Thus, it is conducive to the compression of the pixel pitch to more effectively improve the PPI of the pixel, so that it is conducive to the improvement of the display effect of the display substrate 100.

As shown in FIGS. 7A and 7C, the pixels P include a first pixel P1 and a second pixel P2 that are alternately arranged in the second direction X. Only two adjacent first pixel P1 and second pixel P2 are shown as an example for illustration in FIGS. 7A and 7C.

For example, the display substrate 100 has first pixel regions P10 and second pixel regions P20 arranged alternately. The first pixel P1 is located in the first pixel region P10, and the second pixel P2 is located in the second pixel region P20.

As shown in FIG. 7C, in adjacent first pixel P1 and second pixel P2, the third transistor T3 in the first pixel P1 is adjacent to the third transistor T3 in the second pixel P2. The first direction Y and the second direction X intersect.

In a first pixel P1 and a second pixel P2 adjacent thereto, the third transistor T3 in the first pixel P1 is arranged adjacent to the third transistor T3 in the second pixel P2.

Since the first electrode T3S of the third transistor T3 in the pixel driving circuit 10 needs to be coupled to the second voltage signal terminal VSS through a second voltage connection line LV1 (shown in FIG. 7F), the third transistors T3 in the adjacent first pixel P1 and the second pixel P2 are concentrated arranged. For example, the third transistors T3 are adjacently arranged in the adjacent first pixel P1 and the second pixel P2. Based on this, it is convenient for the second voltage signal terminal VSS to be coupled to the third transistor T3 in the first pixel P1 and the third transistor T3 in the second pixel P2 by using the second voltage connection line LV1, so as to reduce the occupation of the pixel space by the second voltage connection line LV1. Thus, it is conducive to the compression of the pixel pitch to more effectively improve the PPI of the pixel, so that it is conducive to the improvement of the display effect of the display substrate 100.

In some examples, the first direction Y and the second direction X are perpendicular to each other. In some other examples, the first direction Y and the second direction X have an included angle, and the included angle may be an obtuse angle or an acute angle.

In some embodiments, as shown in FIG. 7C, in the adjacent first pixel P1 and second pixel P2, the first electrode T3S of the third transistor T3 in the first pixel P1 is coupled to the first electrode T3S of the third transistor T3 in the second pixel P2.

In a first pixel P1 and an adjacent second pixel P2, the first electrode T3S of the third transistor T3 in the first pixel P1 is coupled to the first electrode T3S of the third transistor T3 in the second pixel P2.

The first electrodes T3S of the two third transistors T3 in the adjacent first pixel P1 and second pixel P2 are coupled, so that the second voltage signal terminal VSS is coupled to both the first electrode T3S of the third transistor T3 in the pixel (e.g., the first pixel P1) and the first electrode T3S of the third transistor T3 in another pixel (e.g., second pixel P2) through a single second voltage connection line LV1. Thus, it is possible to reduce the number of the second voltage connection lines LV1 that need to be used. In this way, it is possible to reduce the occupation of the pixel space by the second voltage connection line LV1, which is conducive to the compression of the pixel pitch to more effectively improve the PPI of the pixel, so that it is conducive to the improvement of the display effect of the display substrate 100.

In some examples, in a process of forming adjacent first pixel P1 and second pixel P2, e.g., forming the first electrode T3S of the third transistor T3 in the first pixel P1 and the first electrode T3S of the third transistor T3 in the second pixel P2, it is possible to directly connect the first electrodes T3S of the two third transistors T3 to further reduce the occupation of the pixel space, so that it is conducive to the compression of the pixel pitch to more effectively improve the PPI of the pixel.

In some embodiments, as shown in FIG. 7C, in the adjacent first pixel P1 and second pixel P2, the first electrode T3S of the third transistor T3 in the first pixel P1 is also used as the first electrode T3S of the third transistor T3 in the second pixel P2.

Based on this, it may also be possible to reduce the occupation of the pixel space by the first electrodes T3S of the third transistors T3, so that it is more beneficial to compress the pixel pitch, and further improve the pixel PPI more effectively.

In some embodiments, as shown in FIGS. 7A, 7D and 7E, the first transistor T1 and the second transistor T2 in the pixel P are arranged in the second direction X. Based on this, as for a previous first pixel P1*a*, a second pixel P2 and a next first pixel P1*b* that are arranged in sequence in the second direction X, the description will be made below.

As shown in FIG. 7D, the first transistor T1 in the previous first pixel Pla is adjacent to the first transistor T1 in the second pixel P2.

Since the gate T1G of the first transistor T1 in the pixel driving circuit 10 needs to be coupled to the first scan signal terminal WS, the first transistors T1 in two adjacent pixels are concentrated arranged. For example, the first transistors T1 in two pixels are arranged adjacent to each other, which may facilitate the coupling of the first scan signal terminal WS to the gate T1G of the first transistor T1.

In some embodiments, as shown in FIG. 7D, the gate T1G of the first transistor T1 in the previous first pixel P1*a* is coupled to the gate T1G of the first transistor T1 in the second pixel P2.

The gates T1G of the two first transistors T1 in two adjacent pixels are coupled, that is, in a case where the first scan signal terminal WS is coupled to the gate T1G of the first transistor T1 in a pixel (e.g., the previous first pixel P1*a*), the first scan signal terminal WS is also coupled to the gate T1G of the first transistor T1 in another pixel (e.g., the second pixel P2). Thus, it is convenient for the first scan signal terminal WS to be coupled to the gates T1G of the first transistors T1.

In some embodiments, as shown in FIG. 7D, the gate T1G of the first transistor T1 in the previous first pixel P1*a* is in contact with the gate T1G of the first transistor T1 in the second pixel P2.

In a process of forming the adjacent previous first pixel P1*a* and second pixel P2, e.g., forming the gate T1G of the first transistor T1 in the previous first pixel P1 and the gate T1G of the first transistor T1 in the second pixel P2, it is possible to directly connect the gates T1G of the two first transistor T1 to further reduce the occupation of the pixel space by the gates T1G of the first transistors T1, so that it is conducive to the compression of the pixel pitch to more effectively improve the PPI of the pixel.

In some examples, the gate T1G of the first transistor T1 in the previous first pixel P1*a* is also used as the gate T1G of the first transistor T1 in the second pixel P2.

Based on this, it may be possible to reduce the occupation of the pixel space by the gates T1G of the first transistors T1 more effectively, so that it is more beneficial to compress the pixel pitch, and further improve the pixel PPI more effectively.

As shown in FIG. 7E, the second transistor T2 in the second pixel P2 is arranged adjacent to the second transistor T2 in the next first pixel P1*b*.

Since the gate T2G of the second transistor T2 in the pixel driving circuit 10 needs to be coupled to the second scan signal terminal DS, the second transistors T2 in two adjacent pixels are concentrated arranged. For example, the second transistors T2 are arranged adjacent to each other in two pixels, which may facilitate the coupling of the second scan signal terminal DS to the gates T2G of the second transistors T2.

In some embodiments, as shown in FIG. 7E, the gate T2G of the second transistor T2 in the second pixel P2 is coupled to the gate T2G of the second transistor T2 in the next first pixel P1*b*.

The gates T2G of the two second transistors T2 in two adjacent pixels are coupled; that is, in a case where the second scan signal terminal DS is coupled to the gate T2G of the second transistor T2 in a pixel (e.g., the second pixel P2), the second scan signal terminal DS is also coupled to the gate T2G of the second transistor T2 in another pixel (e.g., the next first pixel P1*b*). Thus, it is convenient for the second scan signal terminal DS to be coupled to the gates T2G of the second transistors T2.

In some embodiments, as shown in FIG. 7E, the gate T2G of the second transistor T2 in the second pixel P2 is in contact with the gate T2G of the second transistor T2 in the next first pixel P1*b*.

In a process of forming the adjacent second pixel P2 and the next first pixel P1*b*, e.g., forming the gate T2G of the second transistor T2 in the second pixel P2 and the gate T2G of the second transistor T2 in the next first pixel P1*b*, the gates T2G of the two second transistors T2 are in contact directly to enable the gates T2G of the two second transistors T2 to be coupled, which may be possible to further reduce the occupation of the pixel space by the gates T2G of the second transistors T2, so that it is conducive to the compression of the pixel pitch to more effectively improve the PPI of the pixel.

In some examples, the gate T2G of the second transistor T2 in the second pixel P2 is also used as the gate T2G of the second transistor T2 in the next first pixel P1*b*.

Based on this, it may also be possible to reduce the occupation of the pixel space by the gates T2G of the second transistors T2, so that it is more beneficial to compress the pixel pitch, and further improve the pixel PPI more effectively.

Figure 7G:
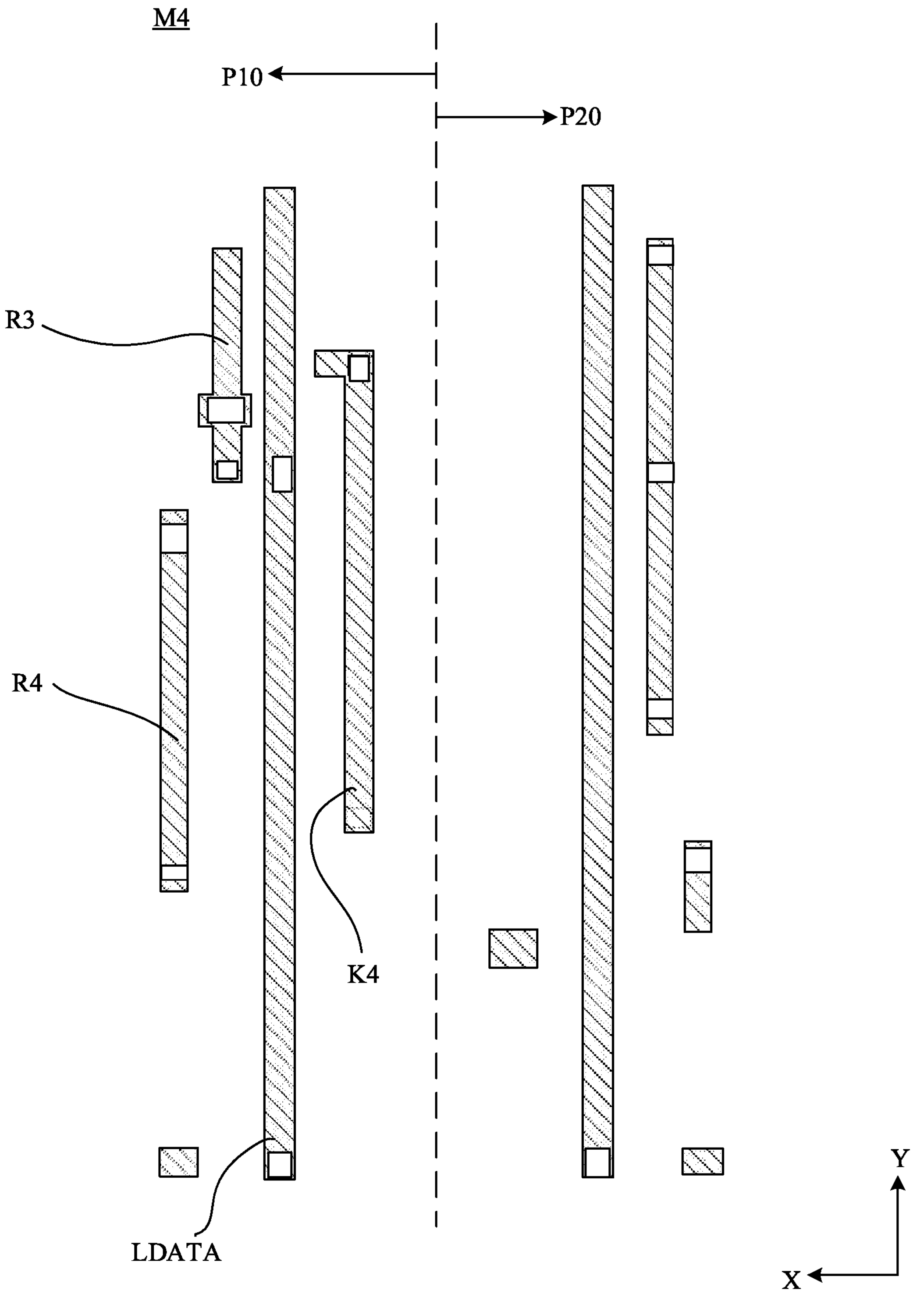
FIG. 7G is a structural diagram of a second wiring metal layer in FIG. 7A.

In some embodiments, as shown in FIGS. 7A, 7F and 7G, the array layer 110 in the display substrate 100 further includes a first wiring metal layer M3 and a second wiring metal layer M4. The first wiring metal layer M3 is located between the second wiring metal layer M4 and the first gate metal layer M2.

As shown in FIG. 7F, the first wiring metal layer M3 includes a first scan signal line LWS, a second scan signal line LDS, a third scan signal line LAZ, and a second voltage signal line LVSS that are each extend in the second direction X and are arranged in the first direction Y.

The second voltage signal line LVSS is electrically connected to the second voltage signal terminal VSS and the first electrodes T3S of the third transistors T3, and the second voltage signal line LVSS is used for transmitting the second voltage signal from the second voltage signal terminal VSS. The first scan signal line LWS is electrically connected to the first scan signal terminal WS and the gates T1G of the first transistors T1, and the first scan signal line LWS is used for transmitting the first scan signal from the first scan signal terminal WS. The second scan signal line LDS is electrically connected to the second scan signal terminal DS and the gates T2G of the second transistors T2, and the second scan signal line LDS is used for transmitting the second scan signal from the second scan signal terminal DS. The third scan signal line LAZ is electrically connected to the third scan signal terminal AZ and the gates T3G of the third transistors T3, and the third scan signal line LAZ is used for transmitting the third scan signal from the third scan signal terminal AZ.

In some examples, a second insulating layer is provided between the first wiring metal layer M3 and the first gate metal layer M2. The second insulating layer is located between the first wiring metal layer M3 and the first gate metal layer M2, and the second insulating layer is used to insulate the first wiring metal layer M3 from the first gate metal layer M2.

For example, a material of the second insulating layer includes any of inorganic insulating materials of silicon nitride, silicon oxynitride and silicon oxide. The material of the second insulating layer may include silicon dioxide, and the present disclosure is not limited thereto.

Based on this, the second voltage signal line LVSS, the first scan signal line LWS, and the second scan signal line LDS that in the first wiring metal layer M3 may be coupled to the corresponding transistors through different via holes. For example, the second voltage signal line LVSS may be connected to the first electrode T3S of the third transistor T3 through a via hole penetrating through the second insulating layer, so as to realize the coupling between the second voltage signal line LVSS and the first electrode T3S of the third transistor T3.

In some examples, as shown in FIG. 7F, the first wiring metal layer M3 further includes first conductive portions R1. Two ends of the first conductive portion R1 are electrically connected to the first electrode TDS of the driving transistor TD and the second electrode T2D of the second transistor T2, respectively. Two ends of the first conductive portion R1 may be respectively electrically connected to the first electrode TDS of the driving transistor TD and the second electrode T2D of the second transistor T2 through different via holes penetrating through the second insulating layer.

In some examples, as shown in FIG. 7F, the first wiring metal layer M3 further includes second conductive portions R2. Two ends of the second conductive portion R2 are electrically connected to the gate TDG of the driving transistor TD and the second electrode T1D of the first transistor T1, respectively. Two ends of the second conductive portion R2 may be respectively electrically connected to the gate TDG of the driving transistor TD and the second electrode T1D of the first transistor T1 through different via holes penetrating through the second insulating layer.

It will be understood that the first wiring metal layer M3 further includes other connection portions to achieve the effective electrical connection of various devices in the pixel driving circuit 10.

As shown in FIG. 7G, the second wiring metal layer M4 includes data signal lines LDATA each extending in the first direction Y. The data signal line LDATA is electrically connected to the data signal terminal DATA and the first electrode T1S of the first transistor T1. The data signal line LDATA is used for transmitting the first data signal or the second data signal from the data signal terminal DATA.

In some examples, a third insulating layer is provided between the second wring metal layer M4 and the first wring metal layer M3. The third insulating layer is used to insulate the second wiring metal layer M4 from the first wiring metal layer M3.

For example, a material of the third insulating layer includes any of inorganic insulating materials of silicon nitride, silicon oxynitride and silicon oxide. The material of the third insulating layer may include silicon dioxide, and the present disclosure is not limited thereto.

Based on this, there are multiple film layers between the data signal line LDATA and the first electrode T1S of the first transistor T1. Furthermore, transfer portions G1 may be provided in the first wiring metal layer M3. The data signal line LDATA located in the second wiring metal layer M4 may be electrically connected to the transfer portion G1 in the first wiring metal layer M3 through the via hole penetrating the third insulating layer, and the transfer portion G1 in the first wiring metal layer M3 is electrically connected to the first electrode T1S of the first transistor T1 located in the first source-drain metal layer M1 through a via hole penetrating through the second insulating layer, the first gate metal layer M2 and the first insulating layer.

In this way, it is possible to achieve the electrical connection between the data signal line LDATA in the second wiring metal layer M4 and the first electrode T1S of the first transistor T1 in the first source-drain metal layer M1 through the transfer portion G1 in the first wiring metal layer M3 and two via holes. Furthermore, it may be possible to prevent the problems of the increase of the process difficulty and blind holes easily formed due to the fact that the via hole is too deep caused by the fact that the data signal line LDATA located in the second wiring metal layer M4 is electrically connected to the first electrode T1S of the first transistor T1 located in the first source-drain metal layer M1 directly through a single via hole.

In some examples, the second wiring metal layer M4 further includes third conductive portions R3. Two ends of the third conductive portion R3 are respectively connected to the second electrode T3D of the third transistor T3 and the second electrode TDD of the driving transistor TD, so that the second electrode T3D of the third transistor T3 is coupled to the second electrode TDD of the driving transistor TD. For example, an end of the third conductive portion R3 may be connected to the second electrode T3D of the third transistor T3 through a via hole, and the other end of the third conductive portion R3 may be connected to the second electrode TDD of the driving transistor TD through another via hole.

It will be understood that the second wiring metal layer M4 further includes other connection portions to achieve the effective electrical connection of various devices in the display substrate 100. For example, the second wiring metal layer M4 further includes fourth conductive portions R4, and two ends of the fourth conductive portion R4 may be electrically connected to the second electrode TDD of the driving transistor TD and the first electrode of the light-emitting device O, respectively. For the electrical connection between the fourth conductive portion R4 and the first electrode of the light-emitting device O, a corresponding transfer portion may be provided between the film layers of the fourth conductive portion R4 and the first electrode of the light-emitting device O, so as to realize the electrical connection, which is not limited in the present disclosure.

In addition, there are two insulating layers and the first wiring metal layer M3 between the data signal line LDATA in the second wiring metal layer M4 and the gate TDG of the driving transistor TD in the first gate metal layer M2, which is conducive to increasing the distance between the data signal line LDATA and the gate TDG of the driving transistor TD to prevent the parasitic capacitance from being generated between the data signal line LDATA and the gate TDG of the driving transistor TD when the data signal line LDATA transmits the first data signal or the second data signal, so that it is beneficial to improve the stability of the driving transistor TD.

Figure 8A:
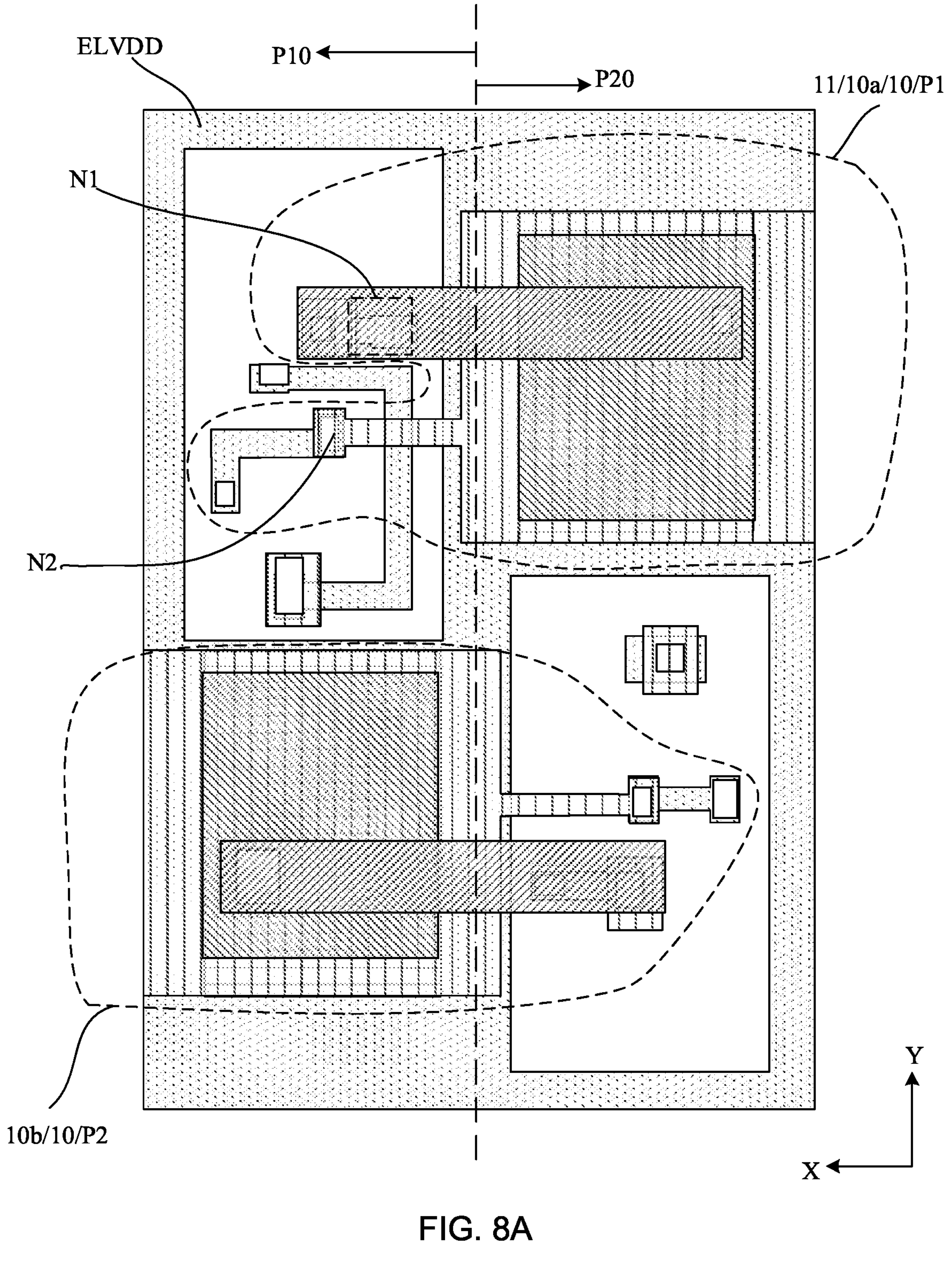
FIG. 8A is a structural diagram of some film layers in FIG. 6.

FIG. 8A is a structural diagram of some film layers in FIG. 6. FIG. 8A only schematically shows the storage sub-circuit in the pixel driving circuit. FIGS. 8B to 8F are structural diagrams of some film layers in FIG. 8A.

In some embodiments, as shown in FIGS. 8A to 8F, the array layer 110 further includes a first capacitor metal layer M5, a second capacitor metal layer M6, and a third capacitor metal layer M7, a fourth capacitor metal layer M8 and a fifth capacitor metal layer M9 that are stacked on the second wiring metal layer M4 in sequence. Adjacent capacitor metal layers are provided with a corresponding insulating layer therebetween, so as to insulate the adjacent capacitor metal layers from each other.

Figure 8B:
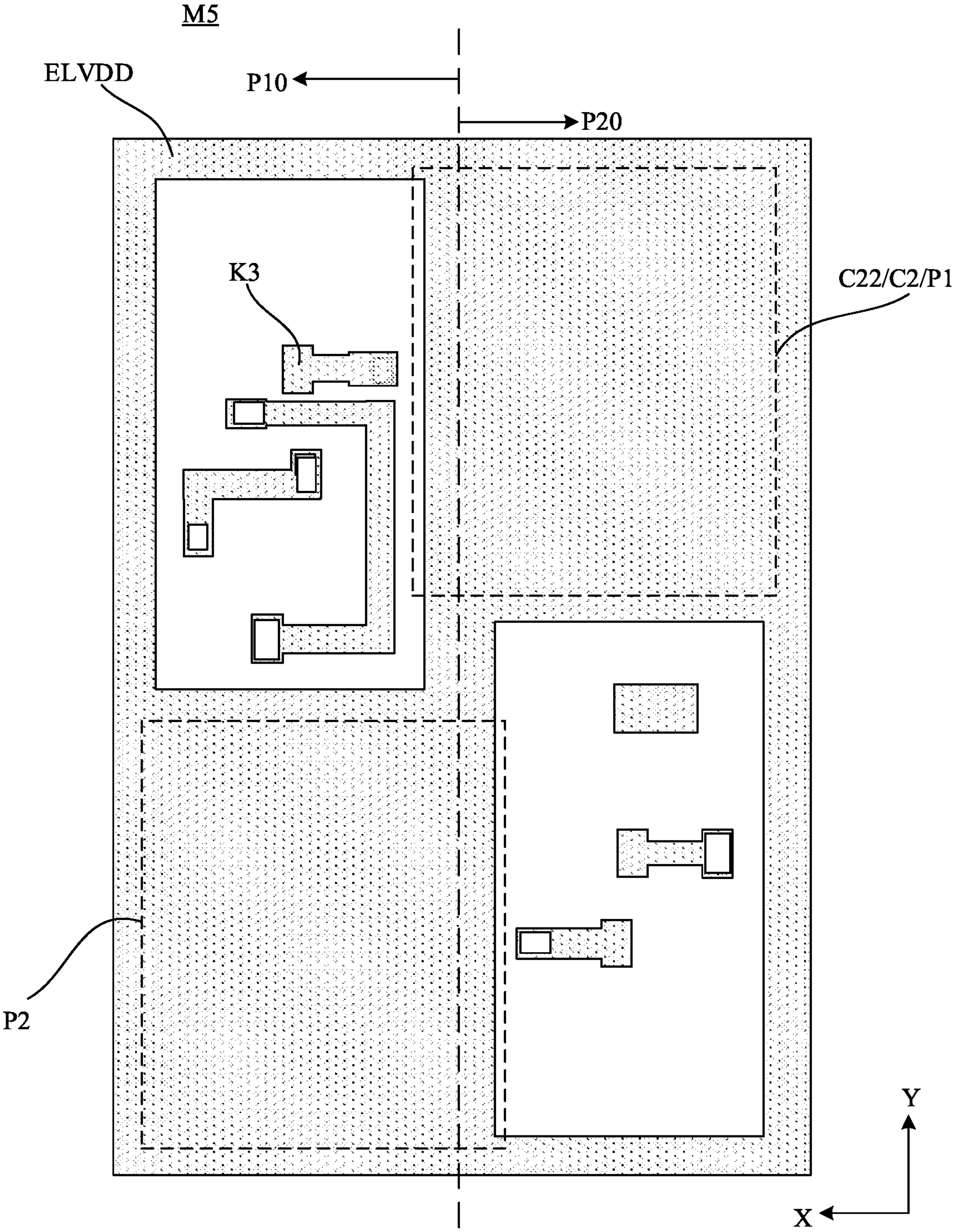
FIG. 8B is a structural diagram of a first capacitor metal layer in FIG. 8A.
Figure 8C:
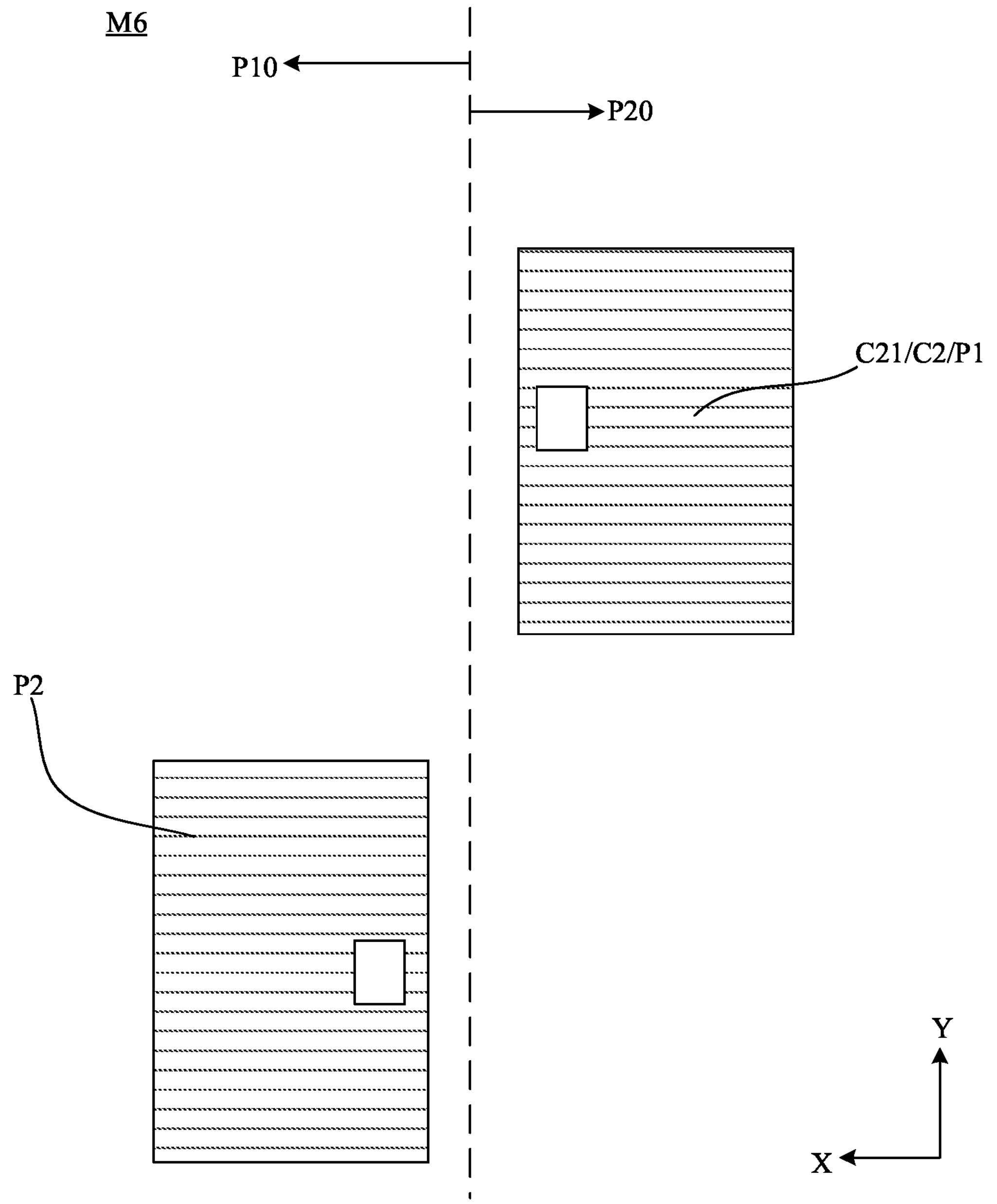
FIG. 8C is a structural diagram of a second capacitor metal layer in FIG. 8A.

The storage sub-circuit 11 includes a first capacitor C1 and a second capacitor C2 connected in series. The two plates of the second capacitor C2 are respectively located in the second capacitor metal layer M6 and the first capacitor metal layer M5. As shown in FIG. 8B, the fourth plate C22 of the second capacitor C2 is located in the first capacitor metal layer M5. As shown in FIG. 8C, the third plate C21 of the second capacitor C2 is located in the second capacitor metal layer M6. As shown in FIG. 8A, in the direction perpendicular to the array layer 110, the fourth plate C22 of the second capacitor C2 overlap at least partially with the third plate C21 of the second capacitor C2 to form the second capacitor C2. FIG. 8A illustrates an example in which the fourth plate C22 of the second capacitor C2 covers the third plate C21 of the second capacitor C2 in the direction perpendicular to the array layer 110.

Figure 8D:
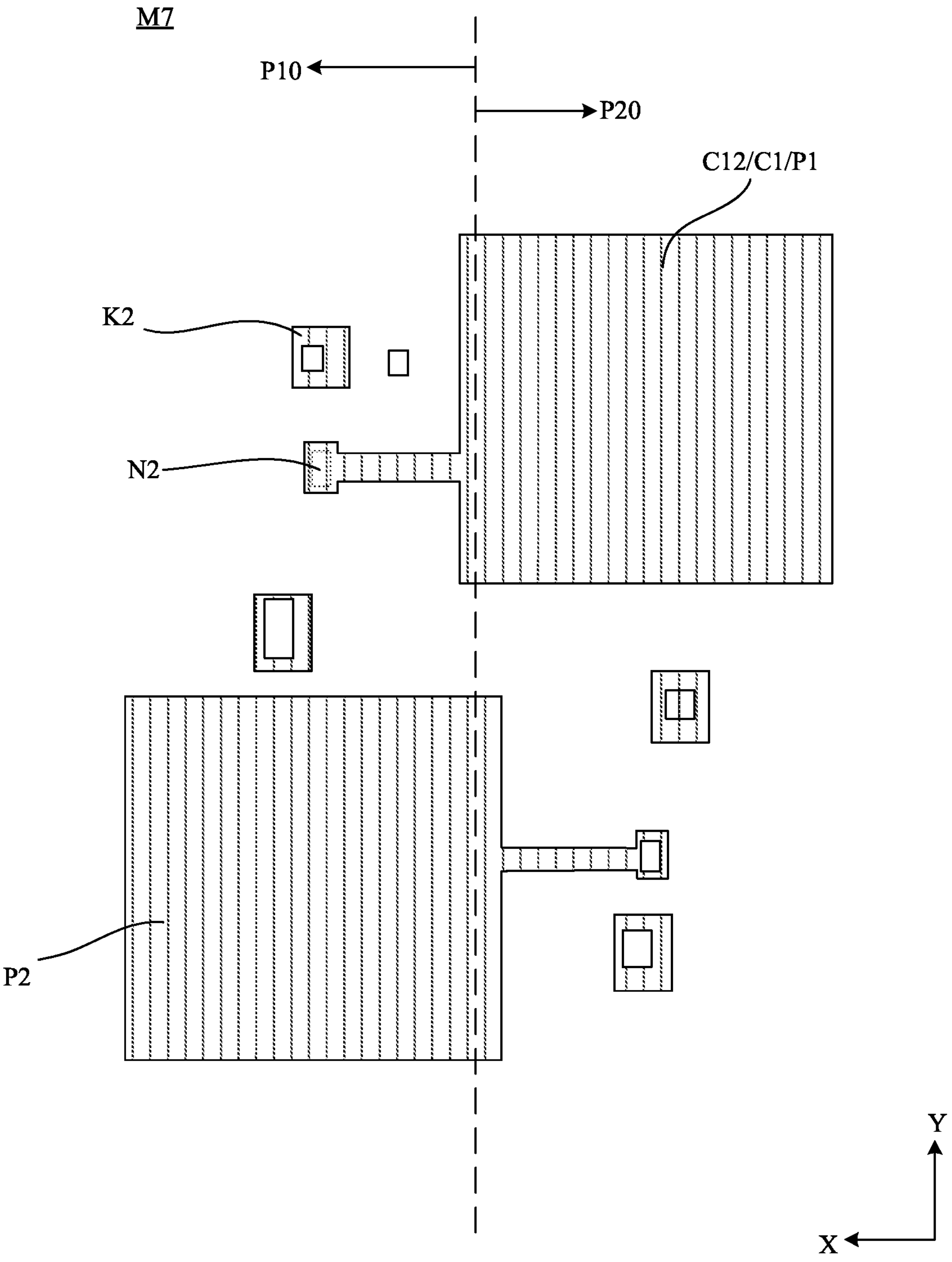
FIG. 8D is a structural diagram of a third capacitor metal layer in FIG. 8A.
Figure 8E:
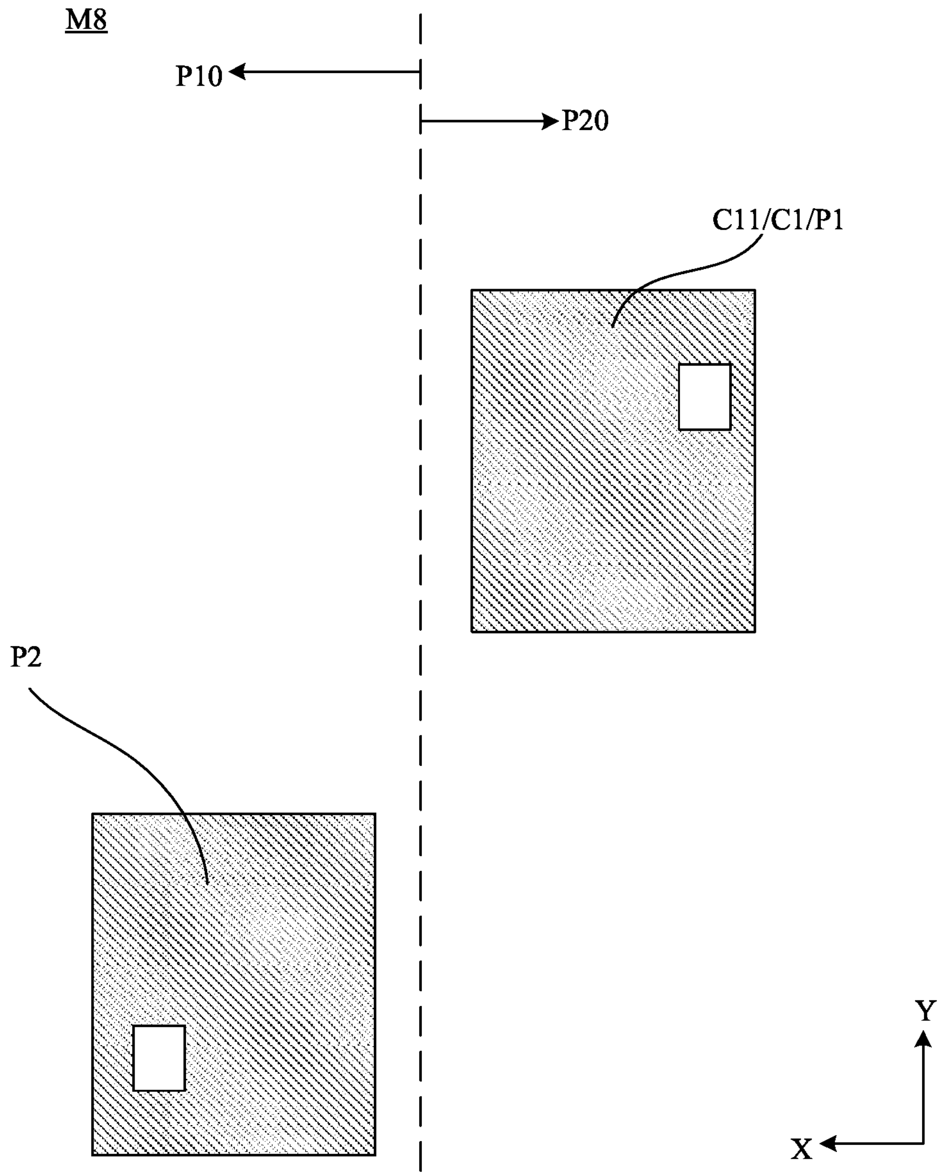
FIG. 8E is a structural diagram of a fourth capacitor metal layer in FIG. 8A.

The two plates of the first capacitor C1 are respectively located in the fourth capacitor metal layer M8 and the third capacitor metal layer M7. As shown in FIG. 8E, the first plate C11 of the first capacitor C1 is located in the fourth capacitor metal layer M8. As shown in FIG. 8D, the second plate C12 of the first capacitor C1 is located in the third capacitor metal layer M7. As shown in FIG. 8A, in the direction perpendicular to the array layer 110, the first plate C11 of the first capacitor C1 overlap at least partially with the second plate C12 of the first capacitor C1 to form the first capacitor C1. FIG. 8A illustrates an example in which the second plate C12 of the first capacitor C1 covers the first plate C11 of the first capacitor C1 in the direction perpendicular to the array layer 110.

The second plate C12 of the first capacitor C1 located in the third capacitor metal layer M7 is coupled to the third plate C21 of the second capacitor C2 located in the second capacitor metal layer M6. An insulating layer is provided between the third capacitor metal layer M7 and the second capacitor metal layer M6. Based on this, the second plate C12 of the first capacitor C1 located in the third capacitor metal layer M7 may be coupled to the third plate C21 of the second capacitor C2 located in the second capacitor metal layer M6 through a via hole penetrating the insulating layer to achieve the series connection of the first capacitor C1 and the second capacitor C2.

The first plate C11 of the first capacitor C1 needs to be electrically connected to the gate TDG of the driving transistor TD in the pixel driving circuit 10.

Figure 8F:
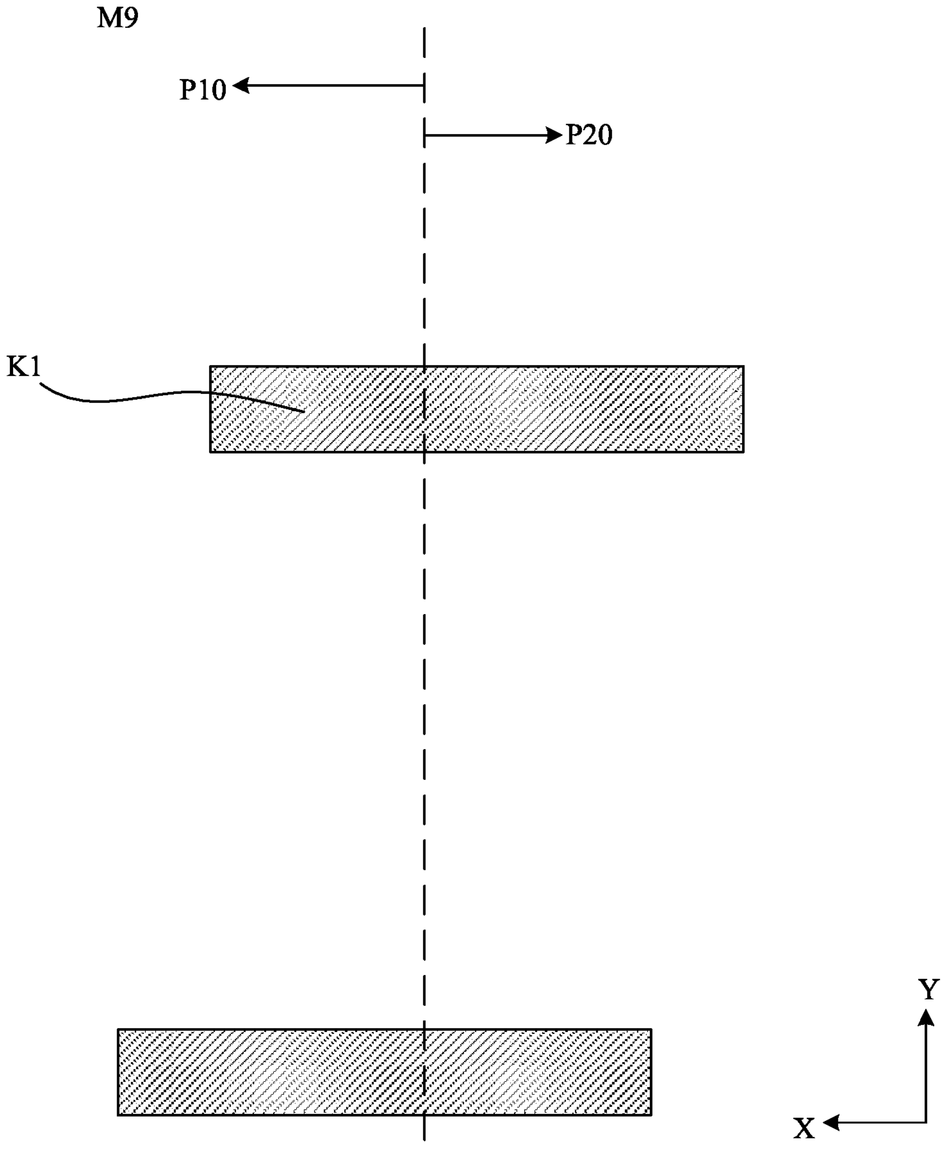
FIG. 8F is a structural diagram of a fifth capacitor metal layer in FIG. 8A.

Based on this, as shown in FIG. 8F, the fifth capacitive metal layer M9 may further include a first connection portion K1. The first connection portion K1 is connected to both the first plate C11 of the first capacitor C1 and the gate TDG of the driving transistor TD, so that the first plate C11 of the first capacitor C1 is electrically connected to the gate TDG of the driving transistor TD.

For example, an end of the first connection portion K1 may be electrically connected to the first plate C11 of the first capacitor C1 in the fourth capacitor metal layer M8 through a via hole penetrating the insulating layer between the fifth capacitor metal layer M9 and the fourth capacitor metal layer M8.

The other end of the first connection portion K1 is electrically connected to the second connection portion K2 located in the third capacitor metal layer M7 through a via hole penetrating the film layers between the fifth capacitor metal layer M9 and the third capacitor metal layer M7. The second connection portion K2 is electrically connected to a third connection portion K3 located in the first capacitance metal layer M5 through a via hole penetrating the film layers between the third capacitor metal layer M7 and the first capacitance metal layer M5. The third connection portion K3 is electrically connected to a fourth connection portion K4 located in the second wiring metal layer M4 through a via hole penetrating the insulating layer between the first capacitance metal layer M5 and the second wiring metal layer M4. The fourth connection portion K4 is electrically connected to a fifth connection portion K5 located in the first wiring metal layer M3 through a via hole penetrating the insulating layer between the second wiring metal layer M4 and the first wiring metal layer M3. The fifth connection portion K5 is electrically connected to the gate TDG of the driving transistor TD located in the first gate metal layer M2 through a via hole penetrating the insulating layer between the first wiring metal layer M3 and the first gate metal layer M2.

There are too many film layers between the first plate C11 of the first capacitor C1 in the fifth capacitor metal layer M9 and the gate TDG of the driving transistor TD in the first gate metal layer M2. In this way, the film layers between the fifth capacitor metal layer M9 and the first gate metal layer M2 are provided with respective connection portions, so that the via hole between the fifth capacitor metal layer M9 and the first gate metal layer M2 may be arranged in segments, which may help to reduce the difficulty of the punching process, and may also help prevent the problem of blind holes caused by too deep via holes, so that it is beneficial to improving the quality of the display substrate 100.

It will be understood that the above description is only considering a connection manner between the first plate C11 of the first capacitor C1 in the fifth capacitor metal layer M9 and the gate TDG of the driving transistor TD in the first gate metal layer M2 as an example, but not limited thereto.

The fourth plate C22 of the second capacitor C2 is electrically connected to the first voltage signal terminal ELVDD. Thus, as shown in FIG. 8B, the fourth plate C22 of the second capacitor C2 and the first voltage signal terminal ELVDD may be arranged in the same layer.

In a case where the fourth plate C22 of the second capacitor C2 and the first voltage signal terminal ELVDD are formed in the first capacitor metal layer M5, the fourth plate C22 of the second capacitor C2 may be in contact with the first voltage signal terminal ELVDD, so as to achieve that the fourth plate C22 of the second capacitor C2 is coupled to the first voltage signal terminal ELVDD. In this way, it may be possible to simplify the manufacturing process of the display substrate 100 and save resources.

In addition, the fourth plate C22 of the second capacitor C2 in the first capacitor metal layer M5 is generally a planar electrode. The first voltage signal terminal ELVDD is coupled to the planar electrode, which may help to reduce the impedance of the first voltage signal terminal ELVDD, so that it is beneficial to preventing the problem of differences in the first voltage signals provided by the first voltage signal terminal ELVDD received by the pixel driving circuits 10 in different pixels P. As a result, it is beneficial to improving the uniformity of the display substrate 100, and improving the display quality of the display substrate 100.

In some embodiments, as shown in FIGS. 7A to 8F, the display substrate 100 includes first pixel regions P10 and second pixel regions P20 alternately arranged. The first pixel P1 is located in the first pixel region P10, and the second pixel P2 is located in the second pixel region P20. The pixel driving circuit 10 includes a first pixel driving circuit 10*a* corresponding to the first pixel P1 and a second pixel driving circuit 10*b* corresponding to the second pixel P2.

The first transistor T1, the second transistor T2, the third transistor T3 and the driving transistor TD in the first pixel driving circuit 10*a* are located in the first pixel region P10. The first transistor T1, the second transistor T2, the third transistor T3 and the driving transistor TD in the second pixel driving circuit 10*b* are located in the second pixel region P20. That is, all the transistors in the pixel driving circuit corresponding to the pixel are arranged in the pixel region corresponding to the pixel.

In some implementations, the first capacitor C1 and the second capacitor C2 in the first pixel driving circuit 10 are set to be located in the first pixel region P10. The first capacitor C1 and the second capacitor C2 in the second pixel driving circuit 10 are set to be located in the second pixel region P20. That is, all the capacitors in the pixel driving circuit corresponding to the pixel are arranged in the pixel region corresponding to the pixel.

As shown in FIG. 7A and FIG. 8A, the driving transistor TD and both the first capacitor C1 and the second capacitor C2 are provided with multiple conductive devices therebetween. If, in the same pixel region, the driving transistor TD is coupled to both the first capacitor C1 and the second capacitor C2, it is necessary to set connection lines for electrical connection between them to avoid the multiple conductive devices. Thus, the pixel space will be occupied, which is not conducive to making full use of the pixel space to improve the pixel PPI. Furthermore, it will also lead to too dense wiring, which increases the difficulty of production, so that it will easily lead to problems such as short circuit and the generation of parasitic capacitance.

In the display substrate 100 in the embodiments of the present disclosure, the first capacitor C1 and the second capacitor C2 in the first pixel driving circuit 10 are set to be located in the second pixel region P20, and the first capacitor C1 and the second capacitor C2 in the second pixel driving circuit 10 are set to be located in the first pixel region P10. That is to say, all the capacitors in the pixel driving circuit corresponding to the pixel are arranged in the adjacent pixel region.

In this way, it may be possible to make full use of the pixel space, and use a connection line extending in the second direction Y to achieve that the driving transistor is coupled to both the first capacitor C1 and the second capacitor C2, so that it may be possible to effectively prevent the problem of wire winding of the connection line used for electrical connection. As a result, it is beneficial to making full use of the pixel space, so as to improve the pixel PPI and thereby improve the display effect of the display substrate 100.

In some embodiments, as shown in FIGS. 8A to 8F, the storage sub-circuits 11 in two adjacent pixels in the first direction Y are arranged in a staggered manner; and the storage sub-circuits 11 in two adjacent pixels in the second direction X are arranged in a staggered manner.

In this way, it may help to increase the placement space of all the plates in the storage sub-circuit 11 to meet the requirement of the size of each plate in the capacitors in the storage sub-circuit 11 and the requirement of the distance between the plates in the adjacent pixels P, which may prevent the problem of interference between capacitors in adjacent pixels P, so that the stability of the storage sub-circuit 11 is improved, and the display quality of the display substrate 100 is improved.

Above all, some embodiments of the present disclosure provide a display panel 100 and a display apparatus 300. The display substrate 100 includes the pixel driving circuit 10, and the first capacitor C1 and the second capacitor C2 in the storage sub-circuit 11 in the pixel driving circuit 10 are both stacked metal-insulator-metal (MIM) capacitors. Moreover, in the direction Z perpendicular to the array layer 110, the first plate C11, the second plate C12, the third plate C21 and the fourth plate C22 have an overlapping region therebetween. Thus, it may be possible to make full use of a space in the pixel P in the direction Z perpendicular to the array layer 110 to arrange the storage sub-circuit 11, so as to save a space occupied by the storage sub-circuit 11 in the pixel P in a direction parallel to the array layer 110. Therefore, it is possible to compress the pixel pitch to the greatest extent and increase the pixel PPI effectively, which is conductive to improve the display effect of the display substrate 100. On this basis, since the display apparatus 300 includes the display panel 200, and the display panel 200 includes the display substrate 100 in any of the above embodiments, the display apparatus 300 and the display panel 200 have all the beneficial effects of the display substrate 100 described above.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. A display substrate, comprising:

an array layer, the array layer including a silicon substrate, a plurality of pixels and a plurality of pixel driving circuits corresponding to the plurality of pixels; wherein a pixel driving circuit of the plurality of pixel driving circuits includes a driving sub-circuit, a storage sub-circuit and a reset sub-circuit; wherein the storage sub-circuit includes a first capacitor and a second capacitor connected in series; a first plate of the first capacitor is coupled to a first node, and a second plate of the first capacitor is coupled to a second node; a third plate of the second capacitor is coupled to the second node, and a fourth plate of the second capacitor is coupled to a first voltage signal terminal;

the driving sub-circuit is coupled to the first node, the second node and a third node, and the driving sub-circuit is configured to generate a driving current under control of the storage sub-circuit and transmit the driving current to a light-emitting device; and the reset sub-circuit is coupled to a third scan signal terminal, a second voltage signal terminal and the third node; the reset sub-circuit is configured to transmit a second voltage signal at the second voltage signal terminal to the third node under control of a third scan signal from the third scan signal terminal in a light-emitting period; and the reset sub-circuit includes a third transistor, a gate of the third transistor is coupled to the third scan signal terminal, a first electrode of the third transistor is coupled to the second voltage signal terminal, and a second electrode of the third transistor is coupled to the third node;

wherein in a direction perpendicular to the array layer, the first plate, the second plate, the third plate and the fourth plate have an overlapping region therebetween;

wherein the driving sub-circuit includes a driving transistor, the pixel driving circuit further includes a first transistor and a second transistor, the first transistor, the second transistor and the driving transistor are P-type transistors; the first transistor, the second transistor and the driving transistor are all located in an N-well region of the silicon substrate; and the third transistor is an N-type transistor; the third transistor is located in a deep N-well region of the silicon substrate.

2. The display substrate according to claim 1, wherein a gate of the driving transistor is coupled to the first node, a first electrode of the driving transistor is coupled to the second node, and a second electrode of the driving transistor is coupled to the third node.

3. The display substrate according to claim 1, wherein the pixel driving circuit further includes a writing sub-circuit; the writing sub-circuit is coupled to a data signal terminal, a first scan signal terminal and the first node; the writing sub-circuit is configured to: transmit a first data signal received at the data signal terminal to the first node under control of a first scan signal received from the first scan signal terminal in an initialization period; and transmit a second data signal received at the data signal terminal under control of the first scan signal received from the first scan signal terminal in a data writing period.

4. The display substrate according to claim 3, wherein the writing sub-circuit includes the first transistor; a gate of the first transistor is coupled to the first scan signal terminal, a first electrode of the first transistor is coupled to the data signal terminal, and a second electrode of the first transistor is coupled to the first node.

5. The display substrate according to claim 1, wherein the pixel driving circuit further includes a light-emitting control sub-circuit;

the light-emitting control sub-circuit is coupled to the first voltage signal terminal, a second scan signal terminal and the second node; the light-emitting control sub-circuit is configured to transmit a first voltage signal at the first voltage signal terminal to the second node under control of a second scan signal from the second scan signal terminal in an initialization period and a light-emitting period.

6. The display substrate according to claim 5, wherein the light-emitting control sub-circuit includes the second transistor; a gate of the second transistor is coupled to the second scan signal terminal, a first electrode of the second transistor is coupled to the first voltage signal terminal, and a second electrode of the second transistor is coupled to the second node.

7. The display substrate according to claim 1, wherein a first source-drain metal layer and a first gate metal layer that are sequentially stacked on the silicon substrate; a first electrode and a second electrode of the first transistor, a first electrode and a second electrode of the second transistor, the first electrode and the second electrode of the third transistor, and a first electrode and a second electrode of the driving transistor are all located in the first source-drain metal layer; and a gate of the first transistor, a gate of the second transistor, the gate of the third transistor, and a gate of the driving transistor are all located in the first gate metal layer.

8. The display substrate according to claim 1, wherein the deep N-well region includes a first doped region and a second doped region; doped ions in the first doped region are N ions, and doped ions in the second doped region are P ions; wherein the first doped region includes a first sub-region and a second sub-region, the first electrode of the third transistor is electrically connected to the first sub-region, and the second electrode of the third transistor is electrically connected to the second sub-region; the second doped region is electrically connected to the second voltage signal terminal.

9. The display substrate according to claim 1, wherein in a pixel corresponding to the pixel driving circuit, in a first direction, a third transistor is located on a side of the driving transistor, and both the first transistor and the second transistor are located on another side of the driving transistor;

the plurality of pixels include first pixels and second pixels alternately arranged in a second direction; in an adjacent first pixel and second pixel, a third transistor in the first pixel is arranged adjacent to a third transistor in the second pixel; wherein the first direction and the second direction intersect.

10. The display substrate according to claim 9, wherein in the pixel corresponding to the pixel driving circuit, the first transistor and the second transistor are arranged in the second direction; and/or in the adjacent first pixel and second pixel, a first electrode of the third transistor in the first pixel is coupled to a first electrode of the third transistor in the second pixel.

11. The display substrate according to claim 9, wherein in a previous first pixel, a second pixel and a next first pixel arranged in the second direction, a first transistor in the previous first pixel is arranged adjacent to a first transistor in the second pixel; and a second transistor in the second pixel is arranged adjacent to a second transistor in the next first pixel.

12. The array substrate according to claim 11, wherein a gate of the first transistor in the previous first pixel is coupled to a gate of the first transistor in the second pixel; and a gate of the second transistor in the second pixel is coupled to a gate of the second transistor in the next first pixel.

13. The display substrate according to claim 7, wherein the array layer further includes a first wiring metal layer and a second wiring metal layer; the first wiring metal layer is located between the second wiring metal layer and the first gate metal layer; wherein the first wiring metal layer includes a second voltage signal line, a first scan signal line, a second scan signal line, and a third scan signal line that each extend in a second direction and are arranged in a first direction; wherein the pixel driving circuit further includes a first transistor and a second transistor, the second voltage signal line is coupled to the second voltage signal terminal and the first electrode of the third transistor, the first scan signal line is coupled to a first scan signal terminal and a gate of the first transistor, the second scan signal line is coupled to a second scan signal terminal and a gate of the second transistor, the second scan signal terminal is coupled to the gate of the second transistor, and the third scan signal line is coupled to the third scan signal terminal and the gate of the third transistor; and the second wiring metal layer includes a data signal line extending in the first direction; the data signal line is coupled to a data signal terminal and a first electrode of the first transistor; wherein the first direction and the second direction intersect.

14. The display substrate according to claim 13, wherein the array layer includes a first capacitor metal layer, a second capacitor metal layer, a third capacitor metal layer, a fourth capacitor metal layer and a fifth capacitor metal layer; wherein the first plate of the first capacitor is located in the fourth capacitor metal layer, the second plate of the first capacitor is located in the third capacitor metal layer, the third plate of the second capacitor is located in the second capacitor metal layer, and the fourth plate of the second capacitor is located in the first capacitor metal layer;

the first plate of the first capacitor is electrically connected to a gate of a driving transistor in the pixel driving circuit through a first connection portion located in the fifth capacitor metal layer, and the fourth plate of the second capacitor is electrically connected to the first voltage signal terminal.

15. The display substrate according to claim 9, wherein the display substrate has first pixel regions and second pixel regions arranged alternately; wherein a first pixel is located in a first pixel region, and a second pixel is located in a second pixel region;

the plurality of pixel driving circuits include a first pixel driving circuit corresponding to the first pixel and a second pixel driving circuit corresponding to the second pixel; wherein a first transistor, a second transistor, a third transistor and a driving transistor in the first pixel driving circuit are located in the first pixel region, and a first capacitor and a second capacitor in the first pixel driving circuit are located in the second pixel region; and a first transistor, a second transistor, a third transistor and a driving transistor in the second pixel driving circuit are located in the second pixel region, and a first capacitor and a second capacitor in the second pixel driving circuit are located in the first pixel region.

16. The display substrate according to claim 9, wherein storage sub-circuits in two adjacent pixels in the first direction are arranged in a staggered manner, and storage sub-circuits in two adjacent pixels in the second direction are arranged in a staggered manner.

17. A display apparatus, comprising the display substrate according to claim 1.

* * * * *